US012656070B2

(12) United States Patent
Cherednik et al.

(10) Patent No.: US 12,656,070 B2
(45) **Date of Patent: *Jun. 16, 2026**

(54) INDUSTRIAL CLEANING SYSTEMS, INCLUDING SOLUTIONS FOR REMOVING VARIOUS TYPES OF DEPOSITS, AND COGNITIVE CLEANING

(71) Applicant: ANGARA GLOBAL LIMITED, London (GB)

(72) Inventors: Eduard Borisovich Cherednik, G. ZHodino (BY); Ilya Yurevich Rodin, Moscow (RU)

(73) Assignee: ANGARA GLOBAL LIMITED, London (GB)

( * ) Notice: Subject to any disclaimer, the term of this patent is extended or adjusted under 35 U.S.C. 154(b) by 17 days.

This patent is subject to a terminal disclaimer.

(21) Appl. No.: 18/564,041

(22) PCT Filed: Jan. 14, 2022

(86) PCT No.: PCT/IB2022/050288
§ 371 (c)(1),
(2) Date: Nov. 24, 2023

(87) PCT Pub. No.: WO2022/248943
PCT Pub. Date: Dec. 1, 2022

(65) Prior Publication Data

US 2024/0263897 A1 Aug. 8, 2024

(30) Foreign Application Priority Data

May 27, 2021 (RU) ........................... RU2021115199

(51) Int. Cl.
*F28G 15/00* (2006.01)
*C11D 1/22* (2006.01)
(Continued)

(52) U.S. Cl.
CPC .............. *F28G 15/003* (2013.01); *C11D 1/22* (2013.01); *C11D 1/83* (2013.01); *C11D 3/06* (2013.01);
(Continued)

(58) Field of Classification Search
None
See application file for complete search history.

(56) References Cited

U.S. PATENT DOCUMENTS 4,636,282 A 1/1987 Wong
4,996,951 A * 3/1991 Archer .................... F22B 37/56
165/95

(Continued)

FOREIGN PATENT DOCUMENTS

EP 3290814 A1 3/2018
RU 2360415 C1 7/2009

(Continued)

OTHER PUBLICATIONS

International Search Report for PCT/IB2022/050288 mailed May 16, 2022, 6 pages.

(Continued)

*Primary Examiner* — Eric W Golightly
(74) *Attorney, Agent, or Firm* — Nixon & Vanderhye PC

(57) ABSTRACT

A method is used for cleaning heat exchanger systems. The method is performed at a computer system having one or more processors and memory storing one or more programs configured for execution by the one or more processors. The method determines component percentages of a cleaning solution based, at least in part, on operational parameters of a heat exchanger system. The operational parameters include chemical composition of fluids passing through the heat exchanger system and operating temperatures of the fluids passing through the heat exchanger system. The
(Continued)

component percentages of the cleaning solution include: (1) hydrogen peroxide. 2-90 wt. %: (2) a complexing agent. 3-30 wt. %: (3) water-soluble calixarene. 0.01-10 wt. %; and (4) water. The complexing agent includes a polybasic organic acid or a sodium salt thereof, or a derivative of phosphorous acid.

23 Claims, 23 Drawing Sheets

(51) Int. Cl.

| | |
|---|---|
| ***C11D 1/83*** | (2006.01) |
| ***C11D 3/06*** | (2006.01) |
| ***C11D 3/20*** | (2006.01) |
| ***C11D 3/33*** | (2006.01) |
| ***C11D 3/36*** | (2006.01) |
| ***C11D 3/39*** | (2006.01) |
| ***F28G 9/00*** | (2006.01) |

(52) U.S. Cl.

CPC .............. *C11D 3/2065* (2013.01); *C11D 3/33* (2013.01); *C11D 3/364* (2013.01); *C11D 3/3942* (2013.01); *F28G 9/00* (2013.01); *C11D 2111/20* (2024.01)

(56) References Cited

U.S. PATENT DOCUMENTS

| | | | | |
|---|---|---|---|---|
| 6,736,089 | B1 * | 5/2004 | Lefebvre | F28G 1/16 122/390 |
| 10,758,948 | B1 | 9/2020 | Harris | |
| 2004/0101461 | A1 | 5/2004 | Lovetro et al. | |
| 2012/0279522 | A1 * | 11/2012 | Varrin, Jr. | C02F 5/12 510/109 |
| 2019/0145722 | A1 | 5/2019 | Myers et al. | |
| 2020/0333093 | A1 | 10/2020 | Ferguson et al. | |
| 2022/0412677 | A1 * | 12/2022 | Sheptunov | C11D 1/83 |

FOREIGN PATENT DOCUMENTS

| | | | |
|---|---|---|---|
| WO | 2016014379 | A1 | 1/2016 |
| WO | 2018098556 | A1 | 6/2018 |
| WO | 2020069593 | A1 | 4/2020 |

OTHER PUBLICATIONS

Written Opinion of the ISA for PCT/IB2022/050288 mailed May 16, 2022, 6 pages.

* cited by examiner

1. Matrix preparation – removal of gel layer and pores cleaning with solvents (zone 1)
2. Pores preparation – reduce surface / interfacial tensions with surfactants
3. Multistage fouling fracturing:
    - Pores flooding with the catalyst
    - Matrix treatment with Alfa PEROX and management of decomposition reaction
    - Supply excessive pore pressure to produce tensional stress overriding tensile strength of the fouling
    - Removal of the fouling debris with the flow

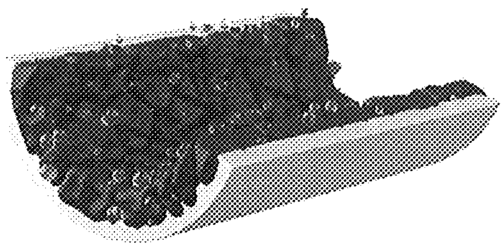

FIG. 5A

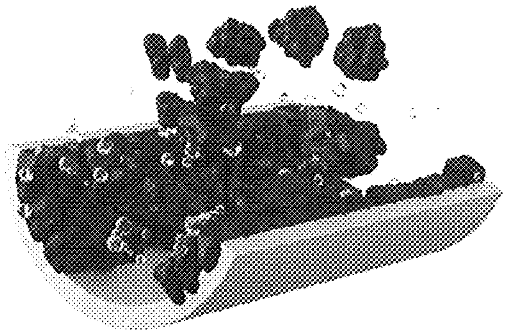

FIG. 5B

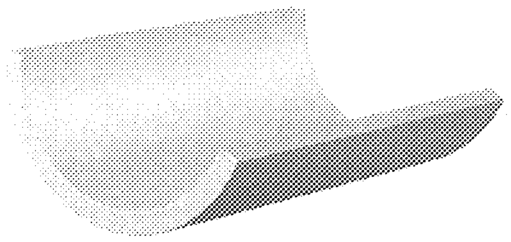

FIG. 5C

| Sample | Inorganics (%) | Organics (%) | Carbon and Carboids (%) |
|---|---|---|---|
| 700-1 | < 1 | 15 | 75 |
| 700-2 | 20 | 75 | 5 |
| 700-3 | < 1 | > 95 | < 4 |
| 700-4 | 50 | < 1 | 50 |

720

| Sample | XRF and ICP-AES Results |
|---|---|
| 700-2 | 62% Fe2O3 |
| | 3% SiO2 |
| | 1.4% Al |
| | 0.6% MnO |
| | 0.6% S |
| | 0.6% CalO |
| 700-4 | 22% Fe2O3 |
| | 14% Cr2O3 |
| | 6.2% S |
| | 4% NiO |
| | 1.2% SiO2 |
| | 0.9% CaO |
| | 0.6% MnO |

FIG. 7C

| Sample | OS1 | OS2 | OS3 | OS4 | OS5 |
|---|---|---|---|---|---|
| 700-1 | inefficient | inefficient | partial dispersion | swelling | swelling |
| 700-2 | inefficient | inefficient | swelling | partial dispersion | inefficient |
| 700-3 | partial dispersion | swelling | swelling | inefficient | inefficient |
| 700-4 | swelling | inefficient | inefficient | swelling | partial dispersion |

FIG. 9A

| Sample | A1 | B1 | B2 | B3 | B4 |
|---|---|---|---|---|---|
| 700-1 | inefficient | complete dispersion | partial dispersion | swelling | inefficient |
| 700-2 | inefficient | partial dispersion | swelling | partial dispersion | complete dispersion |
| 700-3 | inefficient | inefficient | complete dispersion | partial dispersion | swelling |
| 700-4 | inefficient | inefficient | complete dispersion | swelling | inefficient |

FIG. 9B

| Sample | Most Efficient Formulation(s) | Test Results |
|---|---|---|
| 700-1 | OS3+B1 | partial dispersion (75%), complete dispersion |
| 700-2 | OS4+B4+OX | partial dissolution (35%), complete dispersion |
| 700-3 | OS1+B2+OX | partial dissolution (15%), complete dispersion |
| 700-4 | OS5+B3+OX | partial dissolution (25%), complete dispersion |

FIG. 9C

INDUSTRIAL CLEANING SYSTEMS, INCLUDING SOLUTIONS FOR REMOVING VARIOUS TYPES OF DEPOSITS, AND COGNITIVE CLEANING

CROSS-REFERENCE TO RELATED APPLICATIONS

This application is the U.S. national phase of International Application No. PCT/IB2022/050288 filed Jan. 14, 2022, which designated the U.S. and claims priority to RU 2021115199 filed May 27, 2021, the entire contents of each of which are hereby incorporated by reference.

FIELD OF THE INVENTION

The present application relates generally to industrial cleaning systems and methods, including solutions cleaning deposits of various nature from metal, glass, and ceramic surfaces of industrial equipment. The systems can be used for the removal of such deposits, as metal oxides (e.g., iron, chromium, and/or nickel), carbonate and salt deposits, asphalt-tar-paraffin deposits and deposits of an oily nature, deposits of organic and biological nature (bacterial deposits). The present application also includes cognitive cleaning systems and methods, which may utilize the disclosed chemical solutions.

BACKGROUND OF THE INVENTION

Industrial processing such as oil refining may involve the transport of fluids through components such as preheat trains or heat exchangers. Over time and under various conditions, this transport of fluids may result in formation of fouling and scale deposits within the preheat trains or heat exchangers. Fouling reduces the performance of the equipment, which has a negative productivity impact as well as on overall negative economic impact on the industrial process.

Conventional methods of cleaning equipment in preheat trains or heat exchangers require disassembly of equipment, and thus usually occur during plant shutdowns, which occur roughly once every two to four years. Operation of the preheat train systems or heat exchanger systems in between cleanings can be below 50% of the heat transfer efficiency of the system, thus requiring a higher operational cost and increasing carbon emissions output from the system.

An example of a known cleaning method is liquid chemical purification (LCP) [application no. 0277781, PHELPS DODGE IND INC. (US), publ, 10.08.1988, C23G1/10], which consists of the following: for the cleaning process, a washing solution containing $H_2SO_4$ and $H_2O_2$ is used, followed by rinsing and drying. With this method, the washing solution and metal to be cleaned are kept in a heated state and the duration of the treatment is controlled.

This method is effectively used to remove the scale formed by the high temperature thermomechanical treatment of copper rods. The disadvantages of this method are the use of hot solutions, heating of the sample to be cleaned and instability of oxidizing time of hot detergent solutions. However, this method is not versatile and is applicable only for the cleaning of copper rod surfaces.

Another example of a known LCP cleaning process is described in the application 94-021419/02 "method of cleaning copper surface"]. The solution consists of a washing solution containing 45-75 g/l of persulfuric acid obtained by the electrochemical treatment of an aqueous 25-50% solution of sulfuric acid. The treatment is carried out after heating the solution up to 100–120° C. for 3-7 min. The LCP process washing solution is followed by rinsing the products in water and drying them.

This method has several significant disadvantages: it requires the artificial heating of detergent solutions, which results in intensification of their aggressiveness and toxicity. It also has an unstable oxidation capacity and, as a consequence, a non-stable flow of the action process of the cleaning solutions on the surface to be treated. In addition, this method is associated with considerable expenses for neutralization and utilization of industrial wastes.

Yet another example of a known method uses peroxides with complexing compounds in disinfecting compositions [RU 2 360 415 C1, JSC «NPP «Biohimmash» (RU), publ. 10.07.2009, MPK A01N25/22]. This compound uses hydrogen peroxide immobilized on a complexing agent, and is used for the treatment of surfaces for disinfection. 1.5 kg of mechanically activated complexing agent is mixed with 5 kg of peroxide and diluted by adding 30 l of water with the addition of surfactant. One disadvantage of this method is the narrow specificity of application: its use only in disinfecting, the absence of inhibitors of metal oxidation, and the complexity of surface treatment.

One known cleaning solution is taught in U.S. Pat. No. 4,636,282 (GREAT LAKES CHEMICAL CORP (US), publ. 13.01.1987, IPC C23F1/18), consisting of a cleaning process washing solution containing 8-12 wt. %. $H_2SO_4$, 0.004-0.02 M in which a stabilizing additive and 0.5 M $H_2O_2$ is used. Cleaning in this solution is carried out at 50° C., after which the products are rinsed with water and dried. The advantage of this method is the efficient removal of impurities soluble in acids from the surface, i.e. obtaining a shiny surface. The disadvantages of this method include its non-universality (applicable only for copper etching), the use of hot solutions, and the special etching solutions with stabilizing additions.

Yet another example of a known cleaning method, described in US publication US2004101461 (A1), includes an aqueous solution containing hydrogen peroxide in an amount of 20-70 wt. %, a phosphonic acid based complexing agent in an amount of 10-60% (based on the amount of hydrogen peroxide) and water. The solution has a wide application and can be used for bleaching, cleaning, disinfecting, sterilization, and oxidation, including for use in soil saturation with oxygen (suggested). The disadvantages of this solution are insufficient efficacy of the solution when used for cleaning metal surfaces, and an inability to remove metal oxides.

Thus, it is desirable to develop methods and systems for cleaning and eliminating fouling that are based on cost-driven decisions and utilize effective formulations.

SUMMARY

Some embodiments utilize new compositions for the efficient removal of deposits of different nature from different surfaces of equipment and products, such as metal and/or non-metallic surfaces, including glass, ceramic, and polymeric surfaces. One general technical result of the group of inventions is the increase of the efficiency of the solution action (degree of purification) for cleaning deposits of various nature with simultaneous reduction of solution aggressiveness to materials of equipment and articles (structural materials). A further technical result in the case of cleaning metal surfaces is the formation of a highly corrosion-resistant layer on the surface of articles to be cleaned of metals and their alloys.

Some embodiments use a solution for removing deposits of various nature. The solution contains hydrogen peroxide, a complexing agent, calixarene, and water at the following quantitative ratio, weight %: hydrogen peroxide, 2-90; complexing agent, 3-30; calixarene, 0.01-10; water, the balance. Water-soluble chelating agents are used as complexing agents. For example, the chelating agents include polybasic organic acids, their sodium salts, and derivatives of phosphorous acids.

In some embodiments, the solution further comprises an organic acid in an amount of 3 to 30% by weight, where acetic acid is used as an organic acid, as well as formic acid, propanoic acid, butanoic acid, oxalic acid, citric acid, sulfamic acid, adipic, tartaric, lactic, anhydrides of such acids, or any possible combination thereof.

In some embodiments, the solution further comprises a peroxide compound decomposition stabilizer in an amount of 1-5 weight % where sodium hexametaphosphate, potassium phosphate, sodium hydrogen phosphate, and sodium dihydrogen phosphate are used as the peroxide decomposition stabilizer.

In some embodiments, the solution further comprises a surfactant in an amount of 0.5-2.5 weight %, where sulfonol, neonol, or their mixture are used as surfactants, preferably in the ratio of 2:1.

In some embodiments, the solution further comprises an inhibitor in an amount of 0.5-1.5 weight %.

The given task and the required technical result are also achieved due to the concentrated component to obtain the above-mentioned solution, containing complexing agent and calixarene in the following ratio, weight %: complexing agent 60-90; calixarene 10-40.

In some embodiments, the concentrated component comprises an inhibitor in an amount of 5-15% by weight.

In some embodiments, the concentrated component further comprises an organic acid in an amount of 10-85% by weight.

In some embodiments, the concentrated component further comprises a peroxide compound decomposition stabilizer in an amount of 10 to 30% by weight.

In some embodiments, the concentrated component further comprises a surfactant in an amount of from 1 to 10 percent by weight.

The given task and the required technical result are also achieved due to the solution preparation method for cleaning off deposits of different nature, in which the proposed concentrated component is mixed with hydrogen peroxide and diluted with water.

The given task and the required technical result are also achieved due to the method of cleaning the surface by the solution for cleaning from deposits of various nature, including the stage, where the surface is brought into contact with the solution according to the invention, the surface being a metal surface or a non-metallic surface.

The given task and the required technical result are also achieved due to the method of cleaning the surface from deposits of different nature, consisting in combining the mechanical, chemical, and physico-chemical action on indicated deposits by components of the cleaning solution obtained by interaction of concentrated solution, containing at least a complexing agent and calixarene, with hydrogen peroxide, followed by dilution with water, resulting in intensive gas formation on the surface and inside the pores of the deposits with the formation of bubbles with radius from $1.3 \cdot 10^{-6}$ m to $2 \cdot 10^{-3}$ m, which support in the zone of local decomposition temperature up to 150° C. and pressure from 0.1 to 15 MPa, the surface being a metal surface or a non-metallic surface.

The cleaning technology uses a combination of mechanical and chemical action on deposits, and also a combination of complexing and surface-active properties in one molecule of active component (calixarene): one is a complexing agent and the other is a surfactant. The proposed technology uses an exothermic effect of decomposition of peroxide compounds with intensive gas formation on the surface and inside deposits. This effect requires no heating of the cleaning solution, since the decomposition energy is used for these purposes. The use of calixarenes in combination with peroxide compounds also contributes to the absorption reduction of the strength of deposits; this is known as the Rehbinder effect. Intensive gas formation promotes loosening of deposits and desorption from the surface of equipment and articles to be cleaned. In combination with the use of calixarenes that combine in their property both complexing and surface-active properties with the possibility of forming micellar structures, a complete shift of equilibrium towards dissolution of deposits is achieved, including dissolution of metal oxides during the cleaning of metal surfaces.

Conventional cleaning processes require shutdown of the industrial process in order to dismantle and clean the equipment. This is a time consuming and financially costly process since any industrial process must be halted in order to perform the cleaning, and most cleaning is done manually. While there are financial and environmental incentives to keep equipment clean for efficient operation, there are also financial costs to conduct frequent cleaning. Thus, it is desirable to have methods for generating an optimal method for fouling maintenance in equipment.

To address the challenges in fouling maintenance, methods and system for customized fouling maintenance that generate customized cleaning schedules and implement an adaptive cleaning process are provided. Such methods and systems are able to model fouling accumulation in equipment, monitor and model system performance and system efficiency due to fouling accumulation over time, and provide such metrics relative to environmental and financial costs. Using the models, the methods and systems can generate and use predictive models to determine fouling maintenance schedules and fouling cleaning procedures that are customized to meet specific requirements and the key performance indicators (such as financial goals and/or environmental goals) for an application or client.

Compared to conventional cleaning methods, which are only performed during plant shutdown (e.g., every two to four years), the methods and systems described herein can be performed without halting plant operations. Additionally, the methods and systems described herein can increase heat transfer efficiency by up to 70%-80% and significantly reduce carbon emissions from preheat train systems and heat exchanger systems.

In accordance with some embodiments, a method of cleaning heat exchanger systems is conducted at a computer system having one or more processors and memory storing one or more programs configured for execution by the one or more processors. The method includes estimating a fouling level of a heat exchanger system based, at least in part, on measured performance parameters of the heat exchanger system. The performance parameters include rate of heat exchange. The method also includes generating a system performance cost model based on the estimated fouling level of the heat exchanger system and determining an initial cleaning recipe based on operational parameters of the heat exchanger system. The operational parameters include chemical composition of fluids passing through the heat exchanger system and operating temperatures of the fluids passing through the heat exchanger system. The method further includes generating a cleaning cost model based on the initial cleaning recipe, calculating a cleaning schedule to minimize overall operational cost using both the system performance cost model and the cleaning cost model, and executing the initial cleaning recipe at the heat exchanger system according to the calculated cleaning schedule.

In some embodiments, the method further includes collecting a fouling sample from the heat exchanger system during execution of the initial cleaning recipe, characterizing the fouling sample, determining an updated cleaning recipe based at least in part on characteristics of the fouling sample, generating an updated cleaning cost model based on the updated cleaning recipe, and executing the updated cleaning recipe at the heat exchanger system according to the calculated schedule.

In some embodiments, characterizing the fouling sample includes determining one or more of one or more chemical characteristics (e.g., chemical composition) of the sample, one or more mechanical characteristics of the sample, and one or more physical characteristics of the sample.

In some embodiments, the method further includes generating a three-dimensional synthetic model of the fouling sample based on the characteristics of the fouling sample. For example, the synthetic model may be a three-dimensional printed model of the fouling sample that has mechanical and/or physical properties that resemble the collected fouling sample. For example, the synthetic model may have the same porosity and/or the same permeability as the fouling sample.

In some embodiments, executing the initial cleaning recipe at the heat exchanger system includes one or more of: 1) determining the chemical composition of a fouling sample collected from the heat exchanger system; 2) determining the temperature at the heat exchanger system and adjusting the initial cleaning recipe in accordance with the temperature at the heat exchanger system; and 3) determining the pressure at the heat exchanger system and adjusting the initial cleaning recipe in accordance with the pressure at the heat exchanger system.

In some embodiments, determining the initial cleaning recipe based on operational parameters of the heat exchanger system includes retrieving previously generated cleaning recipes from a repository and generating the initial cleaning recipe based on the retrieved cleaning recipes. The previously generated recipes were generated for one or more other heat exchanger systems having operational parameters correlated with the operational parameters of the heat exchanger system. The other heat exchanger systems are similar to the heat exchanger system, but not necessarily identical.

In accordance with some embodiments, a computing device includes one or more processors, and memory coupled to the one or more processors. The memory is configured to store one or more programs that are configured to be executed by the one or more processors, and the one or more programs include instructions for performing any of the methods described herein.

In accordance with some embodiments, a non-transitory computer-readable storage medium stores one or more programs. The one or more programs include instructions, which when executed by a computing device, cause the system to perform any of the methods described herein.

BRIEF DESCRIPTION OF THE DRAWINGS

Certain features of the subject technology are set forth in the appended claims. However, for purpose of explanation, several aspects of the subject technology are set forth in the following figures.

FIGS. 5A-5C illustrate a multi-stage cleaning process according to aspects of the subject technology.

FIGS. 7A-7C illustrate chemical composition analysis results for fouling samples according to aspects of the subject technology.

FIGS. 9A-9C illustrate smart recipe design according to aspects of the subject technology.

DETAILED DESCRIPTION OF THE EMBODIMENTS

Figure 1:
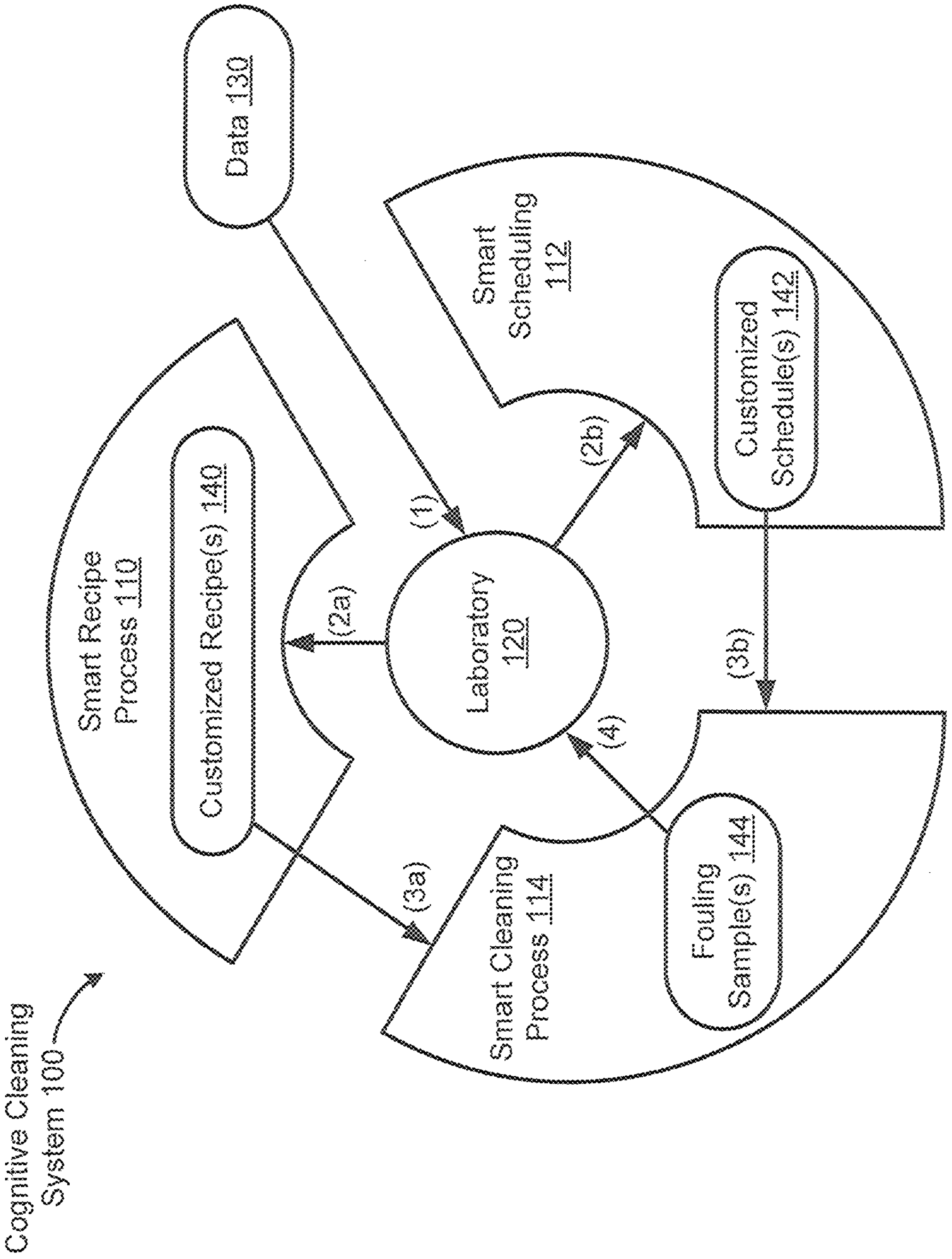
FIG. 1 illustrates features of a cognitive cleaning process according to aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Cleaning Solution Composition

As stated above, the essence of the proposed technology consists in combining mechanical, chemical and physicochemical action against deposits, and also the combining of complexing and surface-active properties in one molecule of an active component.

This involves use of peroxide compounds, such as peroxoacids and hydrogen peroxide. The decomposition of these compounds is accompanied by abundant gas generation with energy emission. The radius of the gas bubbles in the peroxide decomposition reaction ranges from $1.3\cdot10^{-6}$ m to $2\cdot10^{-3}$ m. On one hand, the radius must be greater than size of the deposit pores in order for the formation of the bubbles to create a destructive effect on the deposits. On the other hand, increasing the surface tension will not allow the solution to penetrate into the deposit pores, therefore, in each particular case, an intermediate optimal value of the bubble size is selected. Temperature in deposit pores may reach 150° C. and the pressure of gases in the zone of local decomposition may reach values from 0.1 to 15 MPa. The high efficiency of this process is manifested in the deposit pores when a substantial amount of gaseous products are released in a small volume of space. The volume of released gas is proportional to the concentration of hydrogen peroxide.

Thus, the deposits are subjected to mechanical action, which in combination with a low surface tension at the interface of the phases makes it possible to observe the Rehbinder effect. In addition, the effect of exothermic decomposition causes the solution to be heated, which results in an increase in the rate of manifestation of the effects and the flow of chemical reactions directly in the deposit pores.

The cleaning composition contains hydrogen peroxide, complexing agent, calixarene and water. Hydrogen peroxide in amount of 2-90 wt. % (depending on the concentration of the initial solution) provides the processes of gas formation by exothermic decomposition, which in turn has a destructive effect on deposits. The use of a composition with a percentage of less than 2% does not provide the necessary effect (incomplete cleaning). The use of a composition with a percentage content of more than 90% is not recommended, since in this case the effect of intense decomposition may have a destructive effect on the equipment. The concentration of hydrogen peroxide affects the volume of gas and the temperature in the deposit pores. By changing the concentration of the peroxide component, a given intensity of gas formation is obtained.

The complexing agent is used in an amount of 3-30 wt. %. As complexing agents, it is possible to use water-soluble chelating agents, for example, the sodium salts of the polybasic organic acids or the polybasic organic acids themselves, such as EDTA, as well as derivatives of phosphorous acids, such as, NTMP and HEDP. The use of chelating agent in a concentration of less than 3% does not provide the necessary effect of complex formation, and at a concentration of more than 30%, the chelating agent does not dissolve fully.

Water-soluble calixarene of the general formula is used in an amount of 0.1-10%. Preferably, calixarenes of the general formula are used:

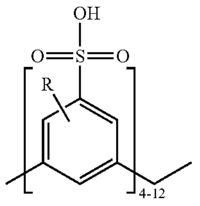

The use of calixarenes of the indicated structure makes it possible to efficiently bind ions of heavy elements, including radioactive ones, forming strong complexes with them. It is possible to use any structures of the above composition. For metal surfaces, compounds with the number of monomer units 6 or 8 are preferred, as in this case the internal cavity of the molecule corresponds to the radius of the heavy elements. The use of calixarenes in less than 0.01% concentration does not provide a complexing effect. If the concentration is increased (more than 10%), no improvement of the cleaning properties is observed.

The use of water-soluble derivatives of calixarenes that combine in their property complexing and surface-active properties, makes it possible to considerably increase efficiency of cleaning. In particular, in the case of metal surfaces, the metal ions are bound and transferred to the micellar phase (early not proposed).

Organic acid can be additionally introduced in an amount of 3-30 wt. %, for example acetic acid, formic acid, propanoic acid, butanoic acid, oxalic acid, citric acid, sulfamic acid, adipic acid, tartaric acid, lactic acid, anhydrides of said acids, or any possible combination thereof. The use of organic acids further increases the efficiency of the decomposition of hydrogen peroxide by the formation of peroxoacids. This range of concentrations provides a maximum effect. Using a lack or excess of reactants, the pH level of the medium will not promote the complexation and the controlled decomposition of the peroxide compounds.

Additional mechanical action on deposits is achieved by the decomposition of peroxide compounds of a number of carboxylic acids C1-C6, and also dicarboxylic C2-C6, tricarboxylic, tetracarboxylic acids. For example, the use of monocarboxylic acids such as acetic acid and formic acid is the most optimal for further increasing the efficiency of carbonate scale purification. For the purpose of producing stable complexes with iron ions, the use of dicarboxylic acids is especially optimal, such as oxalic and adipic, or tricarboxylic acids, e.g., citric acid. The use of tetracarboxylic acid EDTA and/or its salts is most optimal as a universal complexing agent. These examples of specific acids are provided for the purpose of illustrating the embodiment of the group of the invention and are not intended to limit the scope of the invention. These examples of acids should not be construed as limiting the scope of the claimed group of inventions, which is defined by the claims. All carboxylic acids used in this technology are biodegradable.

A decomposition stabilizer of peroxide compounds can be additionally introduced in the composition in amount of 1-5%, for example, sodium hexametaphosphate or similar phosphoric acid salts, such as potassium phosphate, sodium hydrogen phosphate, sodium dihydrogen phosphate. When a stabilizer is used in a concentration of less than 1%, the degradation occurs in an avalanche and is not controlled, while more than 5% does not provide adequate gas generation. The rate of gas generation during the decomposition of the peroxide compounds is mainly dependent on the concentration of the decomposition stabilizer.

Additionally, a surfactant may be added in an amount of 0.5-2.5%. The surfactant used is, for example, sulfonol together with neonol in the ratio of 2:1, but it is possible to use these substances as independent components of the surfactant. The use of the surfactant makes it possible to further increase the efficiency of the solution purification by reducing the surface tension at the liquid-solid interface (cleaning solution-deposit). This effect is due to the absorption of surfactant Molecules on the deposit surface and is due to the similarity of chemical nature in the molecules of the deposits and surfactant. Reduction of surface tension causes better wettability of deposits by cleaning composition, which implies an increase of contact area between the solution and deposits. In addition, the above effect allows the solution to penetrate into the deposit pores, which results in the possibility of delivering peroxide compounds into deposit pores with subsequent decomposition. The selection of a surfactant is an important task and is individually solved depending on the nature of the deposits. Among general cases, it may be noted that anionic surfactants such as alkylbenzenesulfonic acids can be used in oil purification processes; cationic surfactants, such as cetrimonium chloride, can be used for removing deposits of silicate nature. The choice of surfactants is also due to the pH level of the solution, since the use of anionic surfactants is not suitable in an acidic medium, just as cationic surfactants are not suitable in an alkaline medium. The use of a surfactant in concentrations below 0.5% does not provide a wetting effect. Surfactant concentrations more than 2.5% do not affect further improvement of cleaning efficiency. In addition, the surfactant makes it easier to achieve the desired bubble sizes.

In order to eliminate the destructive effect of the cleaning composition directly on metal, glass and ceramic surfaces of equipment, appropriate inhibitors are additionally used in an amount of 0.5-1.5%. These substances form an insoluble strong layer on the surface, which protects the surface against the action of the solution's active components. The use of an inhibitor in less than 0.5% of the concentrations does not provide the proper inhibitory effect, and at a concentration of more than 1.5% does not lead to an increase in the inhibition efficiency. As an inhibitor for metal surfaces, for example, inhibitor KI-1 is used, for alloyed and carbon steels—Catapine-B, for ferrous and non-ferrous metals—KI-1. In particular, inhibitors of metal dissolution prevent oxidative action of peroxide compounds and create an oxidation-resistant protective film.

The washing action is achieved by pumping the cleaning composition through the equipment contours, or by placing the parts in a circulating bath. Example samples (see table 1) were prepared to confirm the quantitative content of reagents in an aqueous solution for cleaning deposits from metallic and non-metallic surfaces. These examples passed the test for the evaluation of purification efficiency.

TABLE 1

Examples (samples) of cleaning solutions.

| Composition, | Examples | | | | | | | | | |
|---|---|---|---|---|---|---|---|---|---|---|
| wt. % | 1 | 2 | 3 | 4 | 5 | 6 | 7 | 8 | 9 | 10 |
| Hydrogen peroxide | 2 | 25 | 90 | 5 | 15 | 30 | 5 | 15 | 60 | 90 |
| Complexing agent | 4 | 4 | 6 | 4 | 4 | 6 | 15 | 30 | 5 | 10 |
| Stabilizer of decomposition of peroxides | 0 | 0 | 0 | 2 | 3 | 4 | 2 | 2 | 8 | 10 |
| Surfactant | 0 | 0 | 0 | 1 | 1 | 2 | 2 | 2 | 2 | 2 |
| Calixarene | 15 | 2 | 0.01 | 10 | 0.1 | 0.1 | 15 | 0.1 | 0.1 | 0.1 |
| Water | balance | balance | balance | balance | balance | balance | balance | balance | balance | balance |

To prepare a solution (sample) of example 1, a concentrated component containing a complexing agent (EDTA) and water-soluble calixarene (6 monomer units) were mixed with a hydrogen peroxide solution of 36% and diluted with water. The resulting cleaning solution had the following composition: hydrogen peroxide (5%), EDTA (4%), water-soluble calixarene (10%), and water (the balance). The resulting solution was pumped through heat exchange equipment contaminated with carbonate deposits and iron oxides. Purity control was carried out by visual method and by the method of differential pressure at the inlet and outlet of the heat exchanger. The results of the efficiency evaluation are shown in Table 2.

TABLE 2

Results of the cleaning efficiency evaluation of solutions samples.

| Cleaning | Examples | | | | | | | | | |
|---|---|---|---|---|---|---|---|---|---|---|
| characteristics | 1 | 2 | 3 | 4 | 5 | 6 | 7 | 8 | 9 | 10 |
| Presence of deposits after cleaning, % to the area | 10 | 0 | 0 | 0 | 0 | 0 | 15 | 0 | 0 | 0 |
| Time of cleaning, hours | 8 | 8 | 8 | 8 | 8 | 8 | 8 | 8 | 8 | 8 |

TABLE 2-continued

Results of the cleaning efficiency evaluation of solutions samples.

| Cleaning characteristics | Examples | | | | | | | | | |
|---|---|---|---|---|---|---|---|---|---|---|
| | 1 | 2 | 3 | 4 | 5 | 6 | 7 | 8 | 9 | 10 |
| Aggressive action of the solution on metal | Partial destruction | absent | absent | absent | absent | absent | Partial destruction | absent | absent | absent |

The solutions of examples 1 and 10 were prepared in the same manner as in example 1, with the following exceptions:

As a complexing agent according to example 2, NTMP was used, according to example 3—EDTA, according to example 4—EDTA, according to example 5—NTMP, according to example 6—HEDP, according to example 7—EDTA, according to example 8—EDTA, according to example 9—HEDP, according to example 10—NTMP; sodium polyphosphate was used as the peroxide decomposition stabilizer in examples 4-10; as the surfactant in example 4, sulfonol was used, in example 5—OP-7, in example 6—sulfonol, in example 7—OP-10, in example 8—OP-7, in example 9—sulfonol, in example 10—OP-10.

The solutions obtained according to examples 2-10 were tested and evaluated in the same manner as in example 1. These tests confirm the increase in efficiency of the inventive solution for removing deposits of various nature while reducing the aggressiveness of the solution to the structural materials.

While the present group of inventions has been described in detail in the examples of embodiments which are the preferred ones, it should be remembered that these embodiments are provided only for the purpose of illustrating the invention. This description is not to be construed as limiting the scope of the invention, since changes in the solution described, in a concentrated component for its preparation, in the method of preparation of the solution and in the method of purification by those skilled in the field of chemistry and others may be made, which are directed to adapt them to specific compositions of solution or situations and do not go beyond the scope of the following claims of the group of inventions. One skilled in the art will recognize that within the scope of the invention, which is defined by the claims, multiple variations and modifications are possible, including equivalent solutions.

Cognitive Cleaning System

FIG. 1 illustrates features of a cognitive cleaning system 100 (e.g., a cognitive cleaning framework) according to aspects of the subject technology. A cognitive cleaning system 100 is used for fouling maintenance in equipment, such as equipment used in heat exchangers and refineries, which are prone to accumulation of fouling. The accumulation of fouling in such equipment can negatively impact the efficiency of the system (e.g., the heat exchanger). Thus, a customized system for cleaning and maintenance of fouling in equipment can improve the efficiency and profitability of a system as well as reduce carbon emissions (e.g., $CO_2$ emissions) of a system by maintaining equipment such that systems (e.g., refineries, natural gas processing systems, sewage treatment systems, water treatment systems, chemical plants) run cleanly and efficiently.

The cognitive cleaning system 100 is customized to address the particular application and needs of a system. For example, equipment from a first system may accumulate fouling that has chemical, mechanical, or physical properties that are different from fouling that is accumulated on equipment from a second system that is different from the first system. The differences in the fouling may be due to any of a variety of factors, such as the material (e.g., fluid) that is transported by the equipment, the temperature at which the equipment is operated, and/or the pressure at which the equipment is operated. Thus, a customized cognitive cleaning system 100 can be tailored to specific needs and challenges of a given system. The cognitive cleaning system 100 includes three main components: a smart recipe process 110 (e.g., methods and systems for generating a customized cleaning recipe), smart scheduling 112 (e.g., methods and systems for generating a customized cleaning schedule), and a smart cleaning process 114 (also referred to herein as smart cleaning process 114 and adaptive cleaning 114) (e.g., methods and systems for executing cleaning of a system in accordance with the smart recipe process 110 and smart scheduling 112).

The cognitive cleaning system 100 is implemented at a laboratory 120 (e.g., a virtual laboratory) that is configured to receive (1) data 130 (e.g., information) from a client regarding their needs and goals (e.g., need fouling maintenance to achieve zero net emissions goal), information regarding operation of the client's system (e.g., information regarding products and processes used at the heat exchanger system), and information regarding fouling from the client's system (e.g., fouling samples collected from the heat exchanger, such as fouling samples collected from wash-out during cleaning of the heat exchanger). The laboratory 120 performs analysis that is used (2*a*) by the smart recipe process 110 and used (2*b*) by smart scheduling 112 to generate models that inform recipe customization (e.g., generation of customized recipes 140) and scheduling customization (e.g., generating customized schedules 142) for effective fouling maintenance that is driven by the client's goals and economic factors. The smart cleaning process 114 executes cleaning of equipment in accordance with (3*a*) customized recipe(s) 140 and in accordance with (3*b*) customized schedule(s) 142 (e.g., cleans the equipment at time intervals as dictated by a customized schedule 142 and uses the customized recipe 140 to clean the equipment). Fouling sample(s) 144 are collected during the cleaning and provided (4) to the laboratory 120 for analysis (e.g., characterization). The smart recipe process 110 and smart scheduling 112 utilize new information obtained via analysis (e.g., characterization) of the collected fouling sample(s) 144 to update the customized recipe(s) 140 and customized schedule(s) 142 for subsequent cleanings.

The smart recipe process 110 includes generating proprietary cleaning recipes 140 that are customized (e.g., tailored) to a client's specific needs and conditions. In some embodiments, the customized recipe(s) 140 (e.g., customized cleaning recipe(s) 140, custom recipe(s) 140) are generated based on information regarding the equipment, the system, and the application type of the system (e.g., equipment in a heat exchanger in an oil refinery, equipment in a heat exchanger in a natural gas processing system, or equipment in a heat exchanger in a sewage treatment plant). For example, information regarding what fluids are transported by the equipment, the temperature and/or pressure at which the equipment is operated, and/or the condition of the equipment may be used in generating the customized recipe 140. In some embodiments, the customized recipe 140 is generated based on characteristics determined from analysis of fouling sample(s) collected (e.g., obtained or received) from the equipment. For example, chemical, mechanical, and/or physical properties of a fouling sample collected during a previous cleaning of equipment can be used to determine (e.g., generate, update, change, or adapt) a customized cleaning recipe for the next cleaning in order to improve the effectiveness and speed of cleaning. In some embodiments, the customized cleaning recipe includes one or more cleaning solutions (e.g., cleaning agents, surfactants, surfaceactives, cleaning compositions) described above. Furthermore, the customized recipe 140 may be updated during cleaning or for subsequent cleanings based on characterization of fouling samples 144 collected during previous cleanings. Additional information regarding the smart recipe process 10 is provided with respect to FIGS. 6 and 9A-9C.

Smart scheduling 112 includes generating a schedule 142 that is customized based on dynamic digital algorithms that utilize data collection (e.g., data collection via sensors at a refinery, such as temperature data at inlets/outlets). The customized schedule 142 (e.g., custom schedule 142) provides recommended cleaning and maintenance schedules that are economics driven to reduce financial and environmental costs. For example, the customized schedule 142 can be customized based on a client's goals, such as to improve system efficiency, reach net zero emission targets, and/or increase profitability. Additionally, the customized schedule 142 may be adjusted based on characterization of fouling samples 144 collected during previous cleanings.

The smart cleaning process 114 executes the customized recipe 140 during a cleaning process. The smart cleaning process 114 does not require disassembly of equipment and thus, the cleaning process can be conducted at any time, including during shut down of a system (e.g., refinery, plant) and during operation of the system (e.g., refinery, plant). For example, a refinery can shut-off flow to one heat exchanger and continue operations using other heat exchangers. The offline heat exchanger can be cleaned while the other heat exchanges and the refinery continue to operate. Additionally, the smart cleaning process 114 can be completed up to 7 times faster than conventional cleaning methods. The smart cleaning process 114 is an adaptive cleaning process that includes on-site and real-time monitoring of the cleaning process so that the smart recipe 110 can be adjusted during the smart cleaning process 114 based on progress of the cleaning process. For example, the temperature, pressure, and/or chemical composition of fouling sample(s) 144 from wash-out collected during the smart cleaning process 114 can be used to adjust the customized recipe 140 during the smart cleaning process 114 and/or adjust (and improve) the customized recipe 140 for the next cleaning.

Figure 2A:
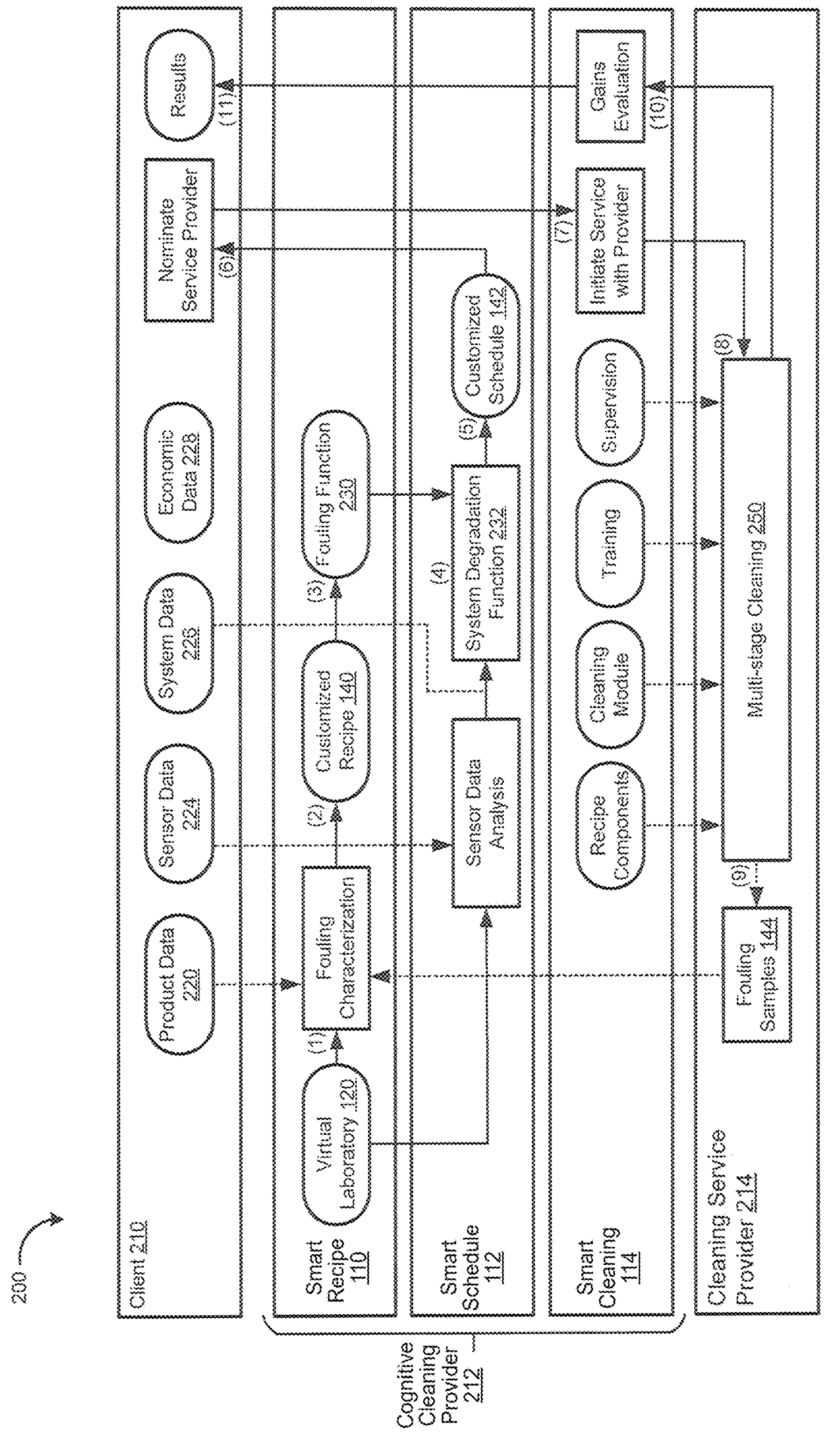
FIG. 2A is a flow diagram illustrating a cognitive cleaning process according to aspects of the subject technology.

FIG. 2A is a flow diagram illustrating a cognitive cleaning process 200 according to aspects of the subject technology. The cognitive cleaning process 200 (e.g., cognitive cleaning procedure 200) is implemented by the cognitive cleaning system 100 and utilizes cooperation across three platforms: a client 210, a provider 212 of the cognitive cleaning system 100 (e.g., cognitive cleaning system provider 212), and a cleaning service provider 214 (e.g., local cleaning service provider 214). For example, the client 210 may be a refinery that requires fouling maintenance (e.g., fouling removal, cleaning) for its equipment. In another example, the client 210 may be a waste management system that requires fouling maintenance for its equipment.

The cognitive cleaning system relies on data collection to generate data-driven models upon which the smart recipe 110, the smart schedule 112, and the smart cleaning process 114 are determined. The cognitive cleaning system 100 is adaptable to real-world data-related challenges, which may encompass highly heterogeneous data availability, data integrity, data reliability, data security and other data challenges. The cognitive cleaning system 100 may rely largely upon data science and machine learning methods and tools. Consequently, the cognitive cleaning system methods will improve as more data is accumulated.

Data used in cognitive cleaning system 100 can be divided into following key categories:

- Product data 220: data on physical and chemical properties of products used in the heat exchanger system;
- System data 226: data characterizing the heat exchanger system, including the architecture, individual current performance, and historical performance of the heat exchanger, which may include sensor data 224 obtained from sensor(s) (e.g., temperature sensor, pressure sensor) at the heat exchanger system;
- Fouling data: data characterizing fouling within the heat exchanger, which may include any of physical, mechanical, and chemical properties of the fouling (e.g., fouling samples 144 collected from wash-out, fouling samples provided by the client 210);
- Economic data 228: data describing outer systems (e.g., macroeconomics, fuel costs, product costs, and market price of supplies) and operational data on production throughput, costs, scheduled and non-scheduled intervention procedures of various types (e.g., maintenance or repairs), their duration, reasons, costs, results, and environmental data describing the environment impact assessments (e.g., emissions or pollution).

Product data 220 may include data on both cold and hot products (e.g., density or viscosity), data on past cleaning, laboratory test results, and chemical characteristics of the products. Product data 220 may include information on the crude oil blend including, but not limited to: API, viscosity @ 80° C.; viscosity @ 260° C., Total sulfur (% wt), Iron (ppm), Nickel (ppm), Vanadium (ppm), Saturates (%), Aromatics (%), Resins (%), Asphaltenes (%), and CII. The subject technology is not limited to these data types and may include other data types.

System data 226 may include unit specifications, system architecture, and overall information including, but not limited to: Plant Location; Service of Unit; Size, Type, Connection type (parallel/consecutive), number of series; Surface/Unit (Gross/Eff), Surf/Shell (Gross/Eff), Surf/Shell (Gross/Eff). System data 226 may also include individual unit performance data including, but not limited to: fluid allocation, fluid name, fluid quantity—vapor in/out, liquid, steam, water, non-condensables), temperature in/out, specific gravity, viscosity, molecular weight (vapor), molecular weight (non-condensables), specific heat, thermal conductivity, latent heat, inlet pressure, velocity, pressure drop, and fouling resistance. System data may also include unit performance data including, but not limited to: Heat Exchanged and Transfer Rate (service). In some embodiments, the system data 226 includes sensor data 224 that is obtained from one or more sensors at the heat exchanger system, such as a temperature sensor for monitoring a temperature at an inlet of the heat exchanger system. System data 226 may also include construction data (shell/tube sides) including, but not limited to: Design/Test Pressure; Design Temperature; Number of Passes per Shell; Corrosion Allowance (including connections in/out, and intermediate); Tube numbers, thickness, length, and pitch; Tube type, Material; Bypass Seal Arrangement; Expansion Joint; and Rho-V2-Inlet Nozzle.

The cognitive cleaning system 100 is characterization method-agnostic. For example, either physical or chemical characterization may be used depending on actual situation on the plant. For the practical use, both chemical characterization of the fouling and understand fouling geometry within the units are used.

Operational data may be collected across an entire production history and used in a plant digital twin to support effective decision-making. The cognitive cleaning system 100 may be fitted with a plant digital twin platform, though it can still run effectively when operational data is available. Operational data may include, but is not limited to: production cost, production throughput, operational events (such as maintenance and reparation including costs, duration, and results), and also environmental data on emission and pollution threshold. Operational data is included, in this example, as part of economic data 228 due to the intertwined nature of system operation and operational cost. For example, emission data may be tied to fines and incentives, and may be monetized (e.g., selling of emission allowances).

Macroeconomic and industry data and forecasts may be used for predictive assertions, which imply reliance on the overall economic parameters, markets and global outlook. This data can be procured directly from the market (e.g., IHS Markit) or assembled through research. According to aspects of the subject technology, economic forecasts may be aligned with the company strategic vision and internal economic models.

Real-time data may be captured and accumulated using an enterprise Internet of Things ("IoT") platform to collect, preprocess, store, and deliver connected sensor data. The cognitive cleaning system 100 may operate using lower discretization rates based on the manually collected data, though some functionality (e.g., real-time cleaning thresholds) may be reduced.

Historical data used with the cognitive cleaning system 100 may be retrieved from corporate repositories of data where it is accumulated. Obtaining historical data from a corporate data lake may be preferable because it is empowered through corporate data governance policy, which can be seen as a quality assurance method enabling data availability, data usability, data consistency, data integrity and data security through a defined set of procedures and an approach to execute those procedures. A data lake is an approach for ingesting and storing all types of data 'as is' in data repositories, and providing an enterprise wide unified access to this data for information management, analytical, and reporting purposes. A data lake supports multiple views of data such as global and local views by maintaining metadata and lineage of data. Certain clarifications can be made through a data steward, who ensures that the data governance processes are followed, Data may be collected, stored, transmitted in analog and/or digital form. The subject technology can be used with both forms of data, though industry standard digital data formats (e.g., CSV, JSON, TXT, or XLS) may provide better results relative to using analog data formats.

The cognitive cleaning system 100 is protocol-agnostic. For example, MQTT (Message Queuing Telemetry Transport) protocol may be deployed by the enterprise IOT platform.

The cognitive cleaning process 200 is initiated once a contract is established between the client 210 and the cognitive cleaning provider 212. The cognitive cleaning provider 212 conducts a fouling impact assessment based on analysis of product data 220 and/or the sensor data 224 provided by the client 210, and performs a heat exchanger (HEX) network analysis and a cleaning assessment for the client's system based on system data 226 provided by the client 210. The cognitive cleaning provider 212 sets up a laboratory 120 (e.g., virtual laboratory 120, virtual cleanliness laboratory 120) that is configured to perform (step 1) fouling characterization (e.g., characterization of fouling samples provided by the client 210 and/or fouling samples 144 collected during cleaning), (step 2) generate customized recipe(s) 140 based on fouling characteristics, and (step 3) generate a fouling function 230 in accordance with (e.g., based on) fouling characteristics and the generated customized recipe(s) 140. The laboratory 120 (e.g., cognitive cleaning provider 212) receives information from the client 210 and/or the cleaning service provider 214. The virtual laboratory may receive any of: fouling samples 144, product data 220 (which may include fouling samples), sensor data 224, heat exchange (HEX) system data 226, and economics data 228 from the client 210. In some embodiments, such as when a previous cleaning has been conducted, the virtual laboratory also receives fouling samples 144 collected from wash-out (from a cleaning process) from the cleaning service provider 214.

Fouling samples received from the client 210 and fouling samples 144 collected during a cleaning process are used for fouling characterization (e.g., fouling characterization is performed on fouling samples received from the client 210 and/or fouling samples 144 received from the service provider 214). In some embodiments, such as when a fouling sample is not available from the service provider 214 (such as in the case where a previous cleaning has not been performed), the fouling characterization (step 1) is performed for fouling samples received from the client 210 and the customized recipe 140 is determined (e.g., generated) based on characteristics of the fouling sample received from the service provider 214. In some embodiments, such as when a fouling sample is not available from the client 210, the fouling characterization (step 1) is performed for fouling samples 144 received from the service provider 214 and the customized recipe 140 is determined (e.g., generated) based on characteristics of the fouling sample 144. In some embodiments, such as when a fouling sample is not available from either the client 210 or the service provider 214, the customized recipe 140 is generated based on information regarding the client's equipment and systems (such as product data 220 and/or system data 226), and information obtained from previous cleanings conducted for other clients (e.g., other systems). For example, if fouling samples cannot be obtained for fouling characterization, the cognitive cleaning provider 212 may generate a customized recipe 140 based on other recipes (e.g., other customized recipes) previously generated for other clients with similar applications (e.g., other refineries) or other clients who work with similar materials. Details regarding fouling characterization is provided with respect to FIGS. 7A-7C and 8A-8F.

Characteristics of a fouling sample, determined via fouling characterization (step 1), is used to generate a customized recipe 140, and a fouling function 230 is generated (step 3) based on the fouling characterization (step 1) and the customized recipe 140. The fouling function 230 is a model that shows a predictive trend of fouling accumulation in the equipment over time. The fouling function 230 is specific to the client 210 and is generated based on characteristics of fouling obtained from the client 210 and/or fouling sample(s) 144 received from the service provider 214. An example of a fouling function 230 is provided below with respect to FIG. 10, and additional details regarding recipe customization (step 2) is provided with respect to FIGS. 6 and 9A-9C.

Figure 11:
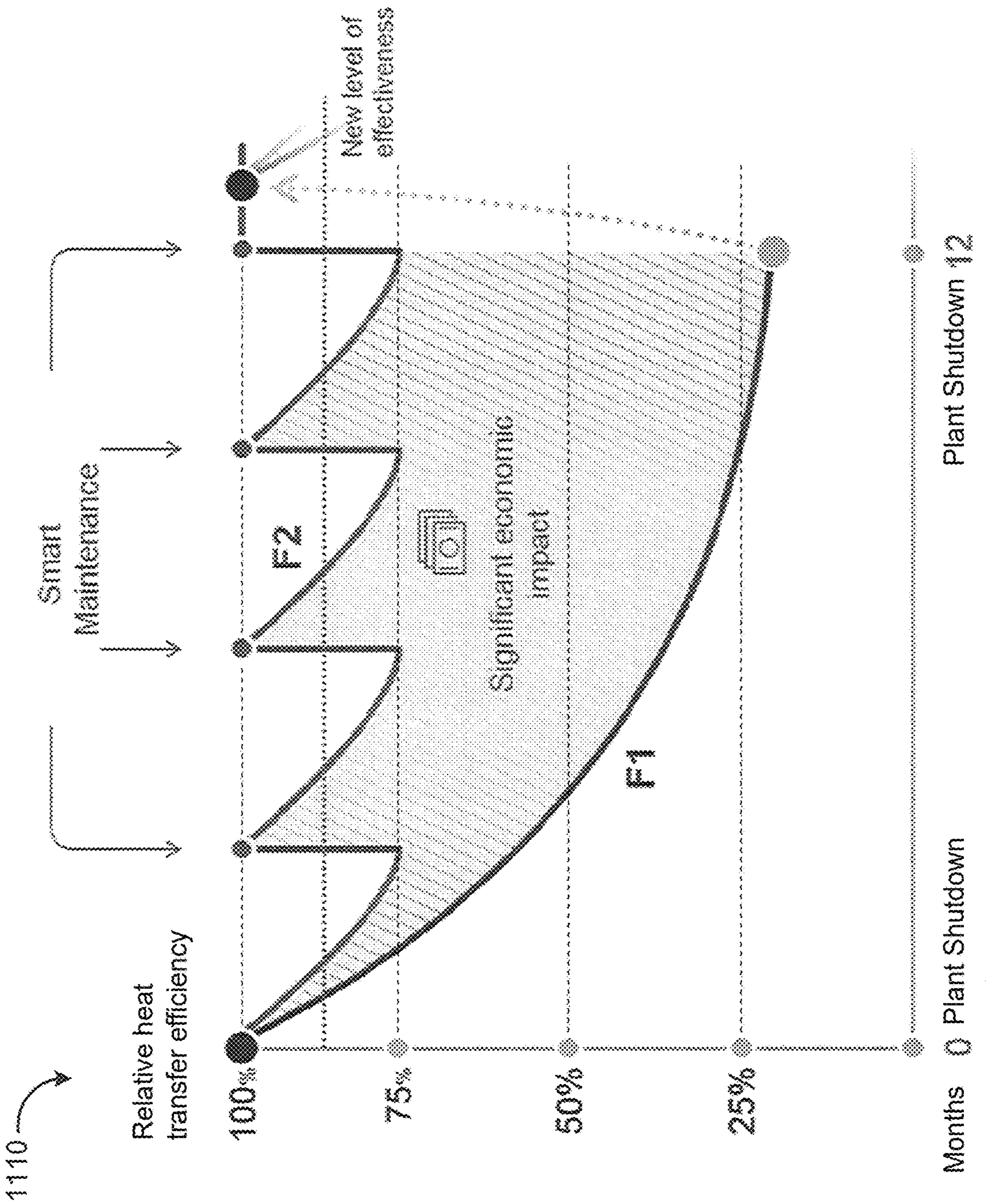
FIG. 11 is a graph illustrating the impact of a smart maintenance schedule on system performance according to aspects of the subject technology.

Sensor data 224 from the client 210 includes information that is indicative of performance and/or efficiency of the client's system (e.g., of the refinery). For example, sensor data 224 may include temperature data at an inlet and an outlet of a heat exchanger. As fouling is accumulated, decreased efficiency of the heat exchanger will be reflected in the temperature data at the inlet and outlet of the heat exchanger. Thus, using analysis of sensor data 224 and the calculated fouling function 230, the cognitive cleaning provider 212 generates (step 4) a HEX degradation function 232 (also referred to as a HEX cleaning function 232). The HEX degradation function 232 is a model of the system's performance (e.g., efficiency) over time (e.g., as fouling is accumulated in the equipment). In some embodiments, the HEX degradation function 232 is expressed relative to one or more metrics that the client 210 has identified. For example, the HEX degradation function 232 may be expressed relative to the cost of operating the refinery. In another example, the HEX degradation function 232 may be expressed in terms of relative heat transfer efficiency. A customized schedule 142 is generated based on the HEX degradation function 232. The customized schedule 142 can be tailored to improve or optimize a specific parameter or key indicator that is important to the client 210. For example, the customized schedule 142 may be optimized to reduce the cost of operating the refinery, reduce the amount of carbon emissions output from the refinery, or a combination of both factors. In addition to the customized schedule 142, the cognitive cleaning provider 212 also provides an estimate of expected gains provided that fouling maintenance is performed using the cognitive cleaning system 100 (e.g., using the customized recipe 140, at intervals as indicated by the customized schedule 142, and executed using the smart cleaning process 114). FIG. 11 provides an example of a HEX degradation function when equipment is not cleaned and a HEX degradation function when the equipment is maintained in accordance with the cognitive cleaning system 100.

The smart scheduling 112 utilizes the HEX degradation function 232 to generate (step 5) a customized schedule 142 for the client 210. The customized schedule 142 is a suggested approach to fouling maintenance of a heat exchanger system that is designed to gain significant positive economic and environment gains. The smart schedule 112 may include a customized schedule 142 (e.g., calendar of scheduled (or recommended) cleanings), provisions for resources planning, plant operations, procurement, security and other aspects. For example, the smart schedule 112 may consider price outlook for products and macroeconomics so that it prefers to schedule cleaning during periods of price or demand downturn. The smart schedule 112 may trigger an alarm digital dashboard associated with Red or Amber zones when there is a risk of "Critical" or "Likely" fouling level estimates being left unscheduled. The results of a smart schedule 112 may be used for a cleaning schedule approval process (e.g., a process for obtaining approval to execute a smart cleaning process 114 in accordance with a customized schedule 142). Once approved, the smart schedule 112 may be used to initiate a cleaning preparation sequence in accordance with company business processes.

The customized schedule 142 is provided (step 6) to the client 210 for approval, and in response to the client's approval of the smart cleaning schedule 112, a service provider 214 is contacted and a contract is established (step 7) with the service provider 214. In some embodiments, the cognitive cleaning provider 212 engages and contracts the service provider 214 to conduct (e.g., execute) the smart cleaning procedure 114. The service provider 214 executes (step 8) multi-stage cleaning 250 (e.g., multi-step cleaning process 250) in accordance with the smart cleaning process 114 (e.g., using customized recipe 140 which includes chemical recipes/cleaning agent recipes and cleaning modules). The multi-stage cleaning 250 is executed by the service provider 214, and the cognitive cleaning provider 122 trains personnel and supervises execution of the multi-stage cleaning 250.

The smart cleaning process 114 is an in-situ adaptive cleaning process that includes a multi-stage cleaning 250 where the customized recipe 140 can be adjusted on-site at each step in the multi-stage cleaning 250. Since individual parameters of the heat exchanger are constantly changing and the customized recipe 140 may require ongoing updates based on data obtained while monitoring the multi-stage cleaning 250. Thus, for maximum effect, components blending can be conducted on-site, allowing for adjustments to customized recipe 140 (as needed) based on data obtained while monitoring the multi-stage cleaning 250.

For example, the smart cleaning process 114 may include any of: monitoring of a pressure inside the equipment during the cleaning process, monitoring of a temperature inside (on of) the equipment during the cleaning process, and analysis of the chemical composition of collected fouling samples in the washout during the cleaning process. The customized recipe 140 can be adjusted during the smart cleaning process 114 based on the information obtained during the smart cleaning process 114. For example, a chemical formula of a cleaning agent in the customized recipe 140 may be changed during the smart cleaning process 114. In another example, a duration of a cleaning stage (e.g., cleaning step) of the multi-stage cleaning 250 may be increased if the fouling is harder to remove than expected or if there is more fouling to remove than expected. During the smart cleaning process 114, the service provider 214 collects (step 9) fouling sample(s) 144 from washout and provides the collected fouling sample(s) 144 to the cognitive cleaning provider 212 for analysis (e.g., fouling characterization). Once the smart cleaning process 114 is completed, the cognitive cleaning provider 212 evaluates (step 10) gains achieved from the multi-stage cleaning 250 that was performed, and the cleaning results are sent (step 11) to the client 210 for approval.

Once the multistage cleaning 250 is completed, the cognitive cleaning provider 212 may also generate a cost outlook that is an actualization of the economic parameters used in optimization process within the smart schedule 112. The cost outlook results may include actual heat exchanger system running costs and smart recipe 110 costs. The cost outlook may be prepared based on the monthly, quarterly and annual fouling level forecasts, open source data which provides access to analytical reports on the current and future economy state, or data procured from the specialized consulting firms.

For example, the cost outlook may provide at least the following information:

price of fuel used in the plant;

volume of fuel to be used (based on the production plans and fouling level forecast);

weighted running costs of heat exchanger system; and cleaning costs expressed in terms of labor, chemicals, duration, indicating the need to disassemble the heat exchanger system The cognitive cleaning system 100 may keep the cost outlook up to date (e.g., updated) and as accurate as possible to improve performance. The cost outlook may use existing contract arrangements. The cost outlook results may include economic and environmental costs of running heat exchanger in various scenarios.

In some embodiments, the client 210 may install equipment, such as a computer system that has access to sensor data 224 obtained at the equipment (e.g., a heat exchanger) and with direct control of the system (e.g., a refinery). The computer system may be configured to automatically switch between an operation mode or a cleaning mode, thereby allowing seamless switching of operations at the system to utilize different equipment while the selected equipment undergoes a cleaning process (e.g., as indicated by the customized schedule 142). For example, commencement of the smart cleaning process 114 may be automated based on the determined customized schedule 142 and sensor data 224. The computer system may determine that the equipment is due for cleaning (e.g., fouling removal) and automatically redirect operations of the system to other pipelines or a back-up heat exchanger so that cleaning can be executed at the equipment identified for cleaning. The computer system may also automatically contact the cleaning service provider 214 (in some cases, with approval from the client 210) in order to initiate a smart cleaning process 114. In some embodiments, the computer system also automatically monitors the progress the multistage cleaning 250 and/or determine a cleaning end point of the multistage cleaning 250 using sensor data 224 recorded at the equipment.

Figure 2B:
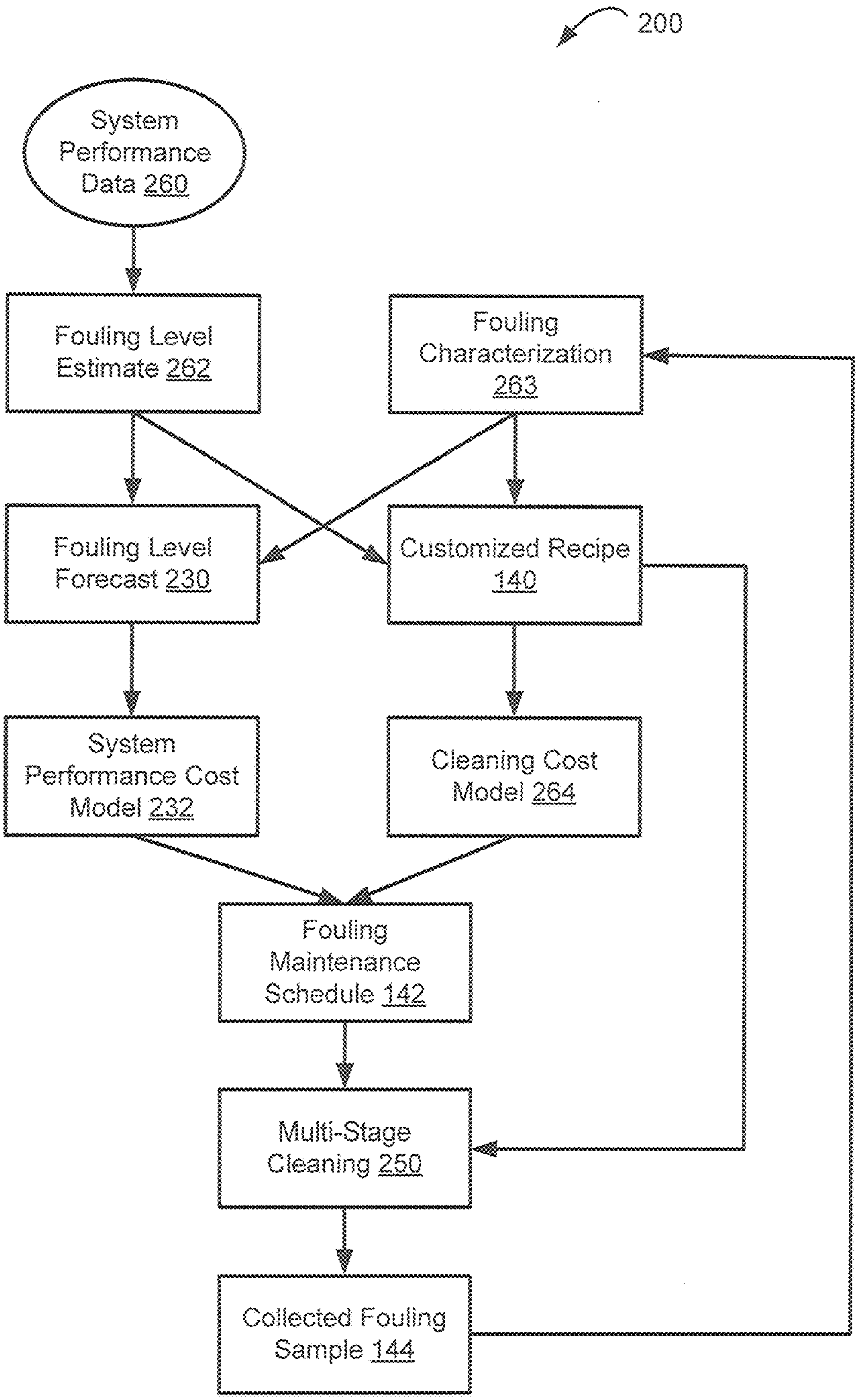
FIG. 2B is a block diagram illustrating implementation of a cognitive cleaning process according to aspects of the subject technology.

FIG. 2B is a block diagram illustrating implementation of the cognitive cleaning process 200 according to aspects of the subject technology. The cognitive cleaning process 200 includes receiving system performance data 260 (such as sensor data 224 that is representative of the performance of a system) and generating a fouling level estimate 262 based on the system performance data 260 (e.g., an estimate of fouling level that corresponds to sensor data 224).

In some embodiments, the cognitive cleaning process 200 includes characterizing 263 a fouling sample (e.g., fouling sample 144) that is collected from a previous cleaning (e.g., collected from washout). The fouling sample 144 may be characterized to determine a chemical composition of the fouling sample, one or more mechanical properties of the fouling sample, and/or one or more physical properties of the fouling sample. In the case where a fouling sample 144 is obtained and characterized, a customized recipe 140 is determined based on characteristics of the fouling sample 144. When characterization of a fouling sample 144 is not available, the customized recipe 140 is determined based on information received about the system. In some embodiments, the information received about the system is compared to information stored in a repository regarding previous cleanings for various clients and the customized recipe (e.g., smart recipe 110) is determined based at least in part on information about the system and information stored in the repository.

The smart recipe process 110 includes tailoring the customized recipe 140, and generating the customized recipe includes: selection of specific ingredients for cleaning the equipment, selection of a specific concentration of each selected ingredient, and selection of a method of applying the selected ingredients.

The ingredients for a customized recipe 140 are determined based on characteristics of the fouling deposited at the equipment (which can be determined via characterization of collected fouling samples and/or estimated based on information regarding the equipment and system operations), information regarding the equipment (including any of: material of the equipment, shape/geometry of the equipment, configuration of the equipment, and type of equipment), and time available for cleaning (e.g., equipment downtime, which may or may not be the same as system downtime). Different characteristics of the fouling, including characteristics such as the level of fouling accumulation, the chemical composition of the fouling, and/or the pore size of the fouling can indicate which types of active agents will be effective in removing the fouling. Additionally, the material of the equipment (e.g., the material that the equipment is composed of) can also indicate which chemicals can or cannot be used. For example, certain chemicals may cause severe or aggressive corrosion when in contact with certain types of materials used in the equipment. While the goal of the cleaning process is to remove fouling, it is also important that the equipment is not damaged or corroded beyond an acceptable degree (e.g., as indicated by the equipment supplier or the client 210). Thus, based on characterization of the fouling, materials in the equipment, and an available and/or expected cleaning time (which is equal to or shorter than equipment downtime), specific chemical components are selected. These are chemicals that will be effective in removing the fouling while keeping corrosion rates within the equipment below an acceptable value can be selected. Selection of ingredients for the customized recipe 140 extend beyond selection of an active ingredient. The recipe also includes selection of ingredients regarding other solutions or chemicals that are included (e.g., used) during the cleaning process. For example selection of ingredients may also include selection of (e.g., selection of ingredients included in) solvent(s), catalyst(s), surfactants, corrosion inhibitors, and/or washing solution(s) that are included as part of the cleaning process.

For example, an organic solvent is selected based on a comparison between an evaluation of target Hansen solubility parameters of fouling material (or its polymeric fraction) and solubility of the organic solvent (e.g., based on a similarity between solubility parameters of the ingredient(s) and solubility parameters of the fouling to be removed). The selected organic solvent has solubility parameters that are as close as possible in Hansen space to respective solubility parameters of the fouling material (e.g., the selected ingredients for an organic solvent have solubility parameters that are similar to the solubility parameters of the fouling material to be removed). In some embodiments, such as when no single organic solvent meets a target similarity (e.g., threshold difference, tolerance) to the solubility parameters of the fouling, different solvents and their respective concentrations are selected such that a mixture of the selected solvents at the respective concentrations have solubility parameters that are within a target similarity to the solubility parameters of the fouling. The tolerance (e.g., the determination of how similar the solubility parameters of the solvent or solvent mixture must be in order to be within the target similarity to the solubility parameters of the fouling) is determined based on (e.g., depends on) a solution to fouling ratio. A lower solution to fouling ratio requires more precise targeting.

The concentration of each selected ingredient is also determined based on equipment material and characterization of fouling deposited at the equipment. In particular, concentration of selected active ingredient(s) are determined based on any of (e.g., one or more of, two or more of, a plurality of) the following factors:

stoichiometric capacity of a specific chemical in terms of its quantitative interaction with specific constituent of fouling material. For example, each percent of HCl in the cleaning solution is able to interact with 1.38 grams of calcium carbonate per each 100 gram of the cleaning solution);

a reaction rate as a function of concentration of the ingredient. For example, the solution of phosphoric acid has a maximum rate of magnetite dissolution at 25% by weight. Thus, exceeding this value is not reasonable provided the time needed for solution replacement does not offset the cleaning at a maximum rate;

a reaction rate as a function of reaction product concentration;

a solubility of the products formed upon the reaction. For example, despite the fact that 25% solution of phosphoric acid has the maximum rate of magnetite dissolution, it cannot be fully converted to iron phosphate solution as the amount of iron phosphate formed upon the reaction exceeds the solubility of the iron phosphate;

an expected amount of fouling material inside the equipment unit;

an expected solution to fouling ratio;

an expected duration of cleaning;

an expected number of solution replacements (e.g., wash cycles in which the washing solution or active ingredient must be replaced with each wash cycle to introduce enough washing solution containing the active ingredient to effectively remove the fouling) and the time loss associated with each replacement (e.g., each wash cycle);

a cost of ingredient and cost of wasted solution disposal; and safety concerns related to corrosion risk assessment (some structural materials from which the equipment is composed may have specific upper or lower concentration limits for compatibility with specific chemicals.

Further, concentration of chemical ingredients other than the active ingredient(s) and solvents or cosolvents for the fouling material are usually determined based on substance-specific or function-specific details regarding the application of the ingredient. For example, a specific concentration of surfactant may be selected to minimize surface tension between a cleaning solution (that includes the active ingredient) and the fouling material. In another example, a specific concentration of surfactant may be selected so that a sufficient concentration of the surfactant is present to stabilize a heterogenous system formed upon disintegration of the fouling material during the cleaning process. In yet another example, a specific concentration of a corrosion inhibitor may be selected based on a minimum required concentration to meet a target corrosion rate limit for the equipment. In some embodiments, the concentrations of function-specific chemicals are selected based on concentration-function relationships that can be empirically determined in a laboratory (e.g., via experiments or calculations).

A method of applying the selected ingredients (in the determined respective concentrations) is determined based on geometry (e.g., size and shape) of the equipment with the accumulated fouling. For example, equipment that includes an inner cavity with an inlet and an outlet may allow chemicals and solutions to be flowed through the equipment. In contrast, equipment that does not have inner cavities that can provide directed flow, have large inner surface area to inner volume ratios, or have heard-to-reach features (even if disassembled) may need to be soaked in a bath. In such cases, the selected solution(s) (such as a solution containing the active ingredient) may be concocted as a foam or as a viscous solution and sprayed directly on a fouled surface of the equipment. In another example, the equipment may be submerged in a bath of cleaning solution and may include agitation (e.g., mixing, stirring, flowing, ultrasonic pulsing) of the cleaning solution in the bath.

Additional details regarding ingredient selection, ingredient concentration determination, and ingredient application method are provided with respect to Appendix A. Once the customized recipe 140 (information regarding which ingredients, at which concentrations and applied using which methods) is determined, a cleaning cost model is determined (e.g., generated) based on the customized cleaning recipe 140.

The cognitive cleaning process 200 further includes generating a fouling level forecast 230 (e.g., fouling function 230) based on the fouling level estimate 262 and, when available, the characteristics of the collected fouling sample 144. The fouling level estimate 262 may be used to reduce financial impact caused by fouling. According to aspects of the subject technology, five probability codes may be established using the fouling level estimate 262. The probability codes include, but are not limited to:

(1) Frequent Level. This probability level indicates that the organization may suffer severe losses and with no work-around to minimize the effect. Immediate action may be required.

(2) Likely Level. This probability level signals that it is very likely that the organization will suffer big losses related to fouling. There are certain known means to reduce the impact which require. Urgent action is required.

(3) Occasional. It is probable that the organization will start to suffer financial losses due to fouling. Fouling penalty is getting higher than the cost of cleaning. Physical smart cleaning may be required.

(4) Seldom. There are indicators that the fouling is building up. The fouling level estimate indicates that the smart scheduling process may be required.

(5) Unlikely. Data doesn't indicate any fouling building-up processes within the system.

In some embodiments, a fouling level estimate 262 dashboard is implemented in the plant control room to monitor building up of fouling and related effects on regular basis.

The fouling level forecast 230 (e.g., fouling function 230) is used to generate a system performance cost model 232 (e.g., system degradation function 232) that represents an expected system performance cost 232 (e.g., system degradation function 232 that predicts/estimates a system performance cost) over time (e.g., with increased fouling accumulation). In some embodiments, the expected system performance cost 232 is expressed in terms of system efficiency. In some embodiments, the expected system performance cost 232 is expressed in terms of carbon emissions. In some embodiments, the expected system performance cost 232 is expressed in terms of financial cost to operate the system. In some embodiments, the expected system performance cost 232 is expressed in terms of the system's net financial profit. For example, the expected system performance cost 232 may take into consideration an efficiency of the system, the amount of fuel required to operate the system, the amount of carbon emissions output due to operation of the system (and any fines that may be associated with excess emissions or any financial benefits that may be associated with selling carbon emission allowances).

A fouling maintenance schedule (e.g., customized schedule 142) is determined based on the system performance cost model 232 and the cleaning cost model 264. For example, in order to reduce financial costs and increase profitability, the fouling maintenance schedule 142 is tailored to allow the system to operate at a reduced (ideally, minimum) overall operational cost (including the cost of cleaning and the cost of system operation).

A smart cleaning process 114 is conducted in accordance with the fouling maintenance schedule 142 and in accordance with the customized cleaning recipe 140. For example, the smart cleaning process 114 includes multi-stage cleaning 250 and the customized recipe 140 indicates which chemical(s) (e.g., cleaning agents, surfactants, etc.) are used at each stage of the multi-stage cleaning 250. The customized cleaning recipe 140 may include information beyond chemical composition (e.g., formula) and concentration of the customized cleaning chemical(s). For example, the cleaning recipe 140 may also include information regarding temperature(s), pressure(s), and/or time duration for each step of the multi-stage cleaning 250. Fouling sample(s) 144 are collected from washout during the multi-stage cleaning 250 (e.g., as part of the smart cleaning process 114). Characterization of the collected fouling sample(s) 144 is used to improve (e.g., adjust, change) the customized recipe 140 for the next scheduled cleaning in accordance with the fouling maintenance schedule 142. Details regarding stages (e.g., steps) of the multi-stage cleaning 250 is provided with respect to FIGS. 5A-5C.

For example, for an initial cleaning (e.g., first execution of multi-stage cleaning 250) of a heat exchanger system, the cognitive cleaning provider 212 calculates the fouling level estimate 262 based on system performance data 260 regarding the heat exchanger system, as described above. The fouling level estimate 262 is used to generate a fouling level forecast 230 (e.g., fouling function 230) and an initial recipe (e.g., customized recipe 140). The initial recipe is customized based on the system performance data 260, which may include sensor data 224 and/or system data 226 regarding the heat exchanger system. The fouling level estimate 262 is used to generate a system performance cost model 232 (e.g., system degradation function 232), and the initial recipe (e.g., customized recipe 140) is used to generate a cleaning cost model 264. The system performance cost model 232 and the cleaning cost model 264 are used to generate an initial fouling maintenance schedule (e.g., customized schedule 142). Multi-stage cleaning 250 is executed at the heat exchanger in accordance with the initial fouling maintenance schedule and the initial recipe. For subsequent cleanings, the initial recipe and/or the initial fouling maintenance schedule can be updated based on characteristics of fouling sample(s) 144 collected during the multi-stage cleaning 250 step. Thus, subsequent cleanings (e.g., multi-stage cleaning 250) for the heat exchanger may utilize an updated recipe (e.g., customized recipe 140) that is different from the initial recipe, and may be conducted in accordance with an updated fouling maintenance schedule (e.g., customized schedule 142) that is different from the initial fouling maintenance schedule. Thus, the cognitive cleaning process 200 is a "smart" process that updates and learns with each performed cleaning (e.g., each iteration).

Figure 3:
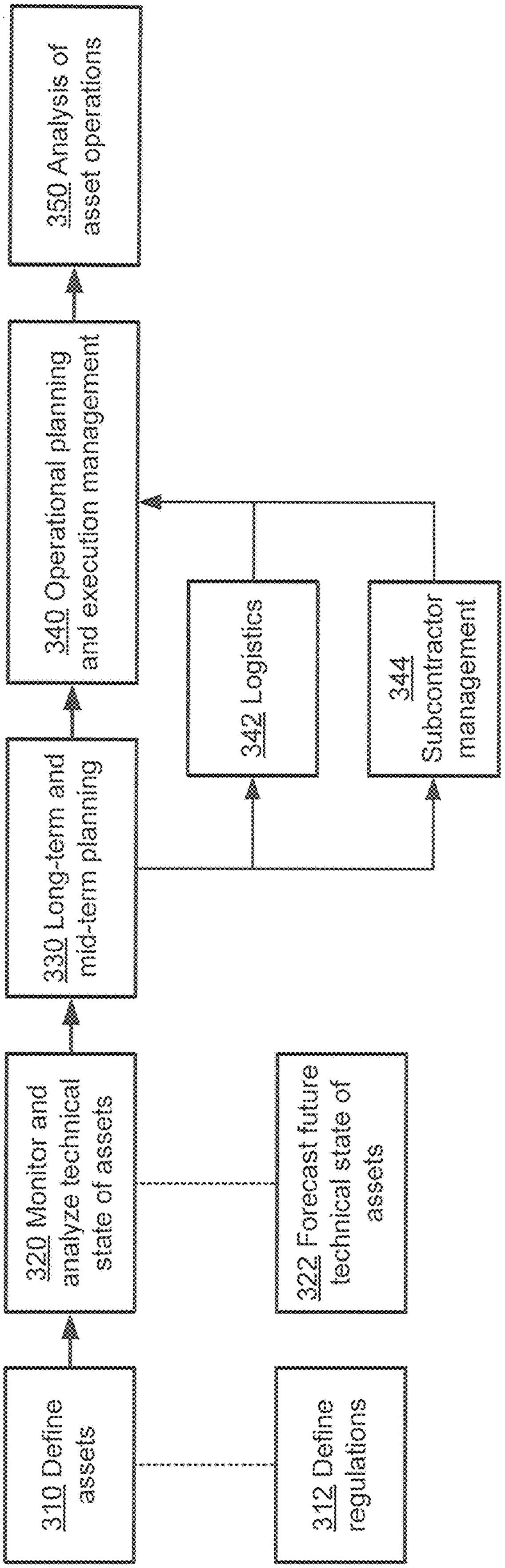
FIG. 3 is a block diagram illustrating aspects of a cognitive cleaning system according to aspects of the subject technology.

FIG. 3 is a block diagram illustrating aspects of a cognitive cleaning system 100 according to aspects of the subject technology. When implementing the cognitive cleaning system 100, it is important to define technical assets 310 in the cleaning program and define a technical roadmap and required cleaning schedule that complies with regulations 312 regarding operation and maintenance of the system. For instance, if a system has to be cleaned at least once every two years, the implemented customized schedule 142 must allow for each piece of equipment of the system (that fall under purview of the regulation) to be cleaned at least once within a 24-month time frame. In another example, if a system is operating within a region that prohibits the use of specific cleaning agents or requires special disposal procedures of specific cleaning agents, the customized recipe 140 (e.g., chemicals and solutions used in the customized recipe 140) must comply with such regulations.

In addition to defining and executing the smart cleaning process 114 in accordance with customized schedules 142 customized recipes 140 (generated as part of the smart scheduling 112 and smart recipe process 110, respectively) that comply with regulations 312, it is also important that the cognitive cleaning system 100 is able to monitor the technical conditions of the equipment (and/or the system) 320, such as receive data that allows the cognitive cleaning system 100 to determine degradation of heat exchange efficiency and hydraulic resistance build-up. Such information allows the cognitive cleaning system 100 to generate data-driven models that provide an accurate forecast 322 of the performance of the system and an accurate forecast 322 of the fouling accumulation in the system, and thus, provide an effective customized schedule 142 based on model predictions (e.g., accurate predictions) for the system.

The cognitive cleaning provider 212 also provides short-term and long-term plans 330, including defining cleaning operations on a yearly, quarterly, and monthly basis. The cognitive cleaning provider 212 also provides short-term and long-term forecasts on cleaning costs and works to negotiate a budget-conscious customized cleaning schedule 142. The cognitive cleaning provider 212 also handles procurement of materials (e.g., for cleaning agents used in the customized recipe(s) 140) and services (e.g., contracting service providers 214) for implementation of the multi-step cleaning 250.

The cognitive cleaning provider 212 also provides operational planning 340 of implementing (e.g., executing, performing, conducting) the smart cleaning process 114, including managing logistics 342 and subcontractors to perform work orders. The cognitive cleaning provider 212 also manages accounting of fulfilled work orders, use of materials, cost of cleaning, and gain sharing and/or service-level agreement benefits.

The cognitive cleaning system 100 also provides an analysis 350 of the planned (e.g., estimated) cognitive cleaning service provided by the cognitive cleaning system 100 in comparison to actual implementation of the cognitive cleaning service. For example, the cognitive cleaning system 100 may provide cost comparisons, gains/results comparisons, and/or a comparison of planned (e.g., scheduled) cleanings versus actual cleanings.

Figure 4:
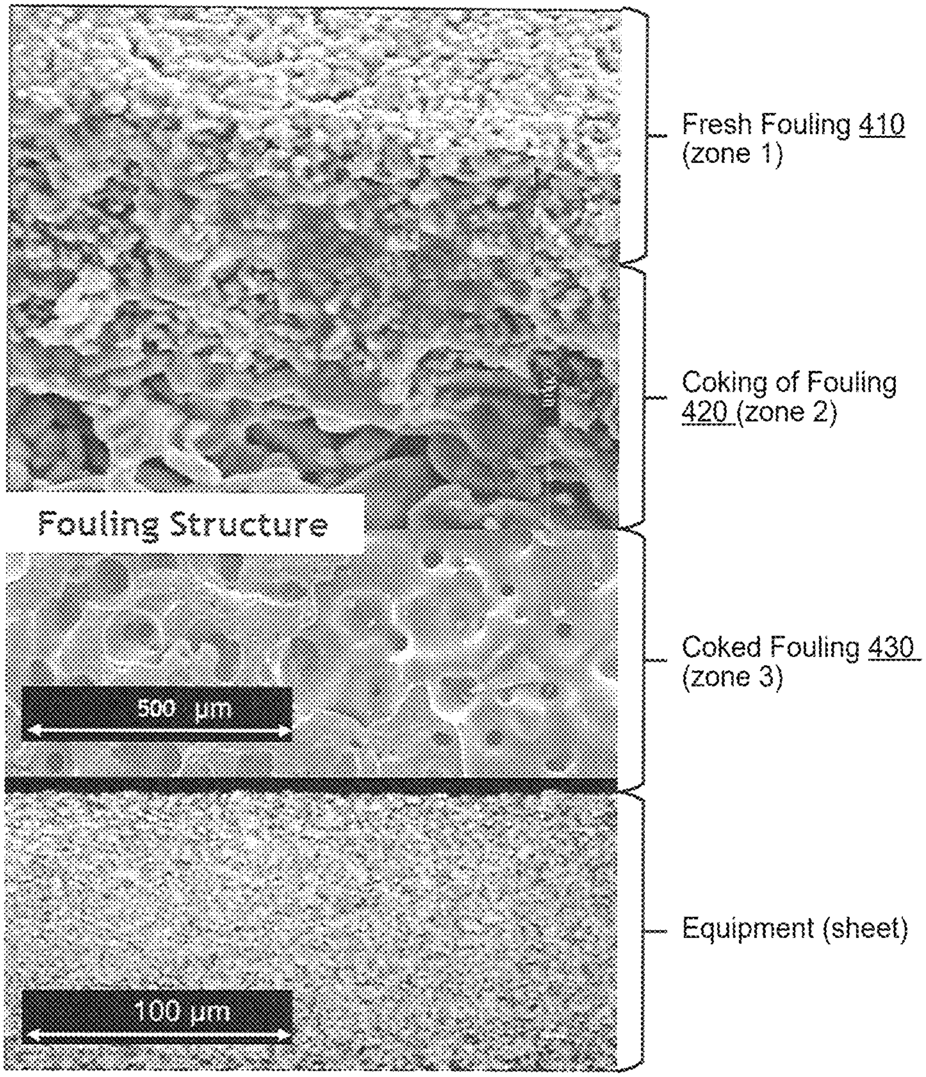
FIG. 4 illustrates a cross section of equipment that includes different types of fouling according to aspects of the subject technology.

FIG. 4 illustrates a cross section of equipment that includes different types of fouling according to aspects of the subject technology. In general, the fouling structure accumulated within a piece of equipment can be classified into one of three categories: fresh fouling 410, coking of fouling 420, and coked fouling 430. Fresh fouling 410 has a gel-like structure that is soft relative to the other types of fouling. Coking of fouling 420 occurs in zone 2 where the gel-like structure of the fresh fouling begins to harden due to age. Coked fouling 430 is fouling that has transitioned from the gel-like structure of fresh fouling 410 to a hard matrix that is filled with resins and is typically found near the equipment (e.g., steel, tubing). Of the three types of fouling, coked fouling 430 is the most challenging to remove.

FIGS. 5A-5C illustrate a multi-stage cleaning process (e.g., multi-stage cleaning 250) according to aspects of the subject technology.

The multi-stage cleaning 250 begins by using solvent(s) to remove the fresh fouling 410 found in zone 1 and clean out the pores in the coking fouling 420 and coked fouling 430 found in zones 2 (if any) and 3. Once the fresh fouling 410 is removed and any resins in the pores of the fouling (e.g., fouling 420 and 430) in zones 2 and 3 are removed, the multi-stage cleaning 250 includes using surfactants to prepare the pores in the coking fouling 420 and coked fouling 430, and reduce surface tensions and interfacial tensions.

Figure 5D:
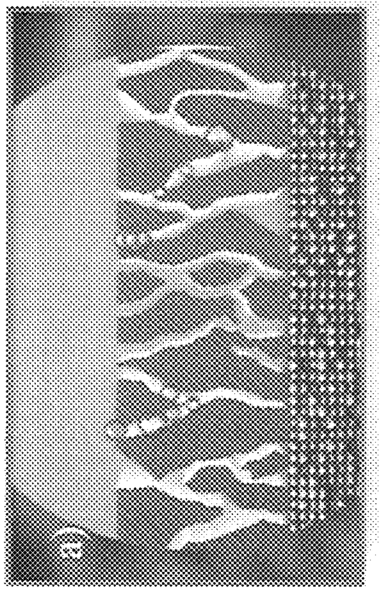
FIGS. 5D-5F illustrate fouling fracturing according to aspects of the subject technology.

As shown in FIG. 5A, the multi-stage cleaning 250 includes flooding the pores with a catalyst and treating the hardened matrix with fouling fracturing agent(s) (e.g., Alfa PEROX), as determined in the customized recipe 140. In some embodiments, the fouling fracturing agents include a cleaning agent that is designed (e.g., configured) to release oxygen as it decomposes, for example, generation of oxygen due to decomposition of hydrogen peroxide). As shown in FIG. 5B, the fouling fracturing agent(s) penetrate deep into pores of the hardened fouling matrix and fractures the fouling (e.g., the coking fouling 420 and the coked fouling 430). Once the fouling is fractured, a solution is flowed through the equipment to wash the loosened and fractured fouling out of the equipment and remove any scaling deposits remaining in the equipment. The cleaning solution and fouling debris are 'washed out' of the equipment and the fouling debris in the washout (e.g., fluid that is washed out from the equipment) is collected as a fouling sample (e.g., fouling sample 144). The fouling sample is characterized in order to improve the smart recipe 110 for future cleanings. As shown in FIG. 5C, the fractured fouling and debris is removed as a result of the fouling fracturing process and the equipment is cleaned. The customized recipe 140 utilizes specialized and proprietary solutions that induce fracturing of the fouling. Details of the cleaning solutions (e.g., cleaning solution composition) is provided above, and details regarding the fouling fracturing process are provided below with respect to FIGS. 5D-5F.

Figure 5E:
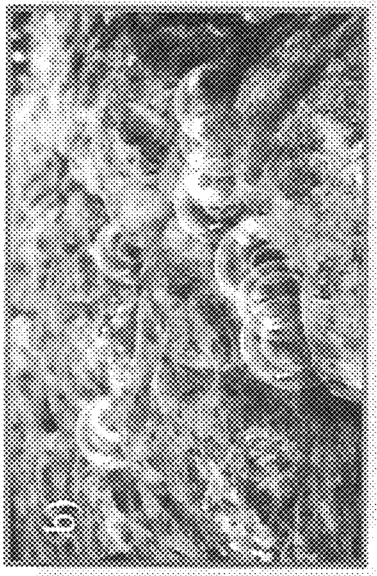
Figure 5F:
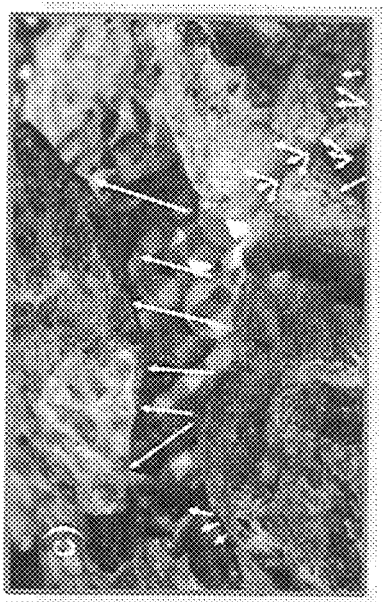

FIGS. 5D-5F illustrate fouling fracturing according to aspects of the subject technology. FIG. 5D illustrates the fouling fracturing agent(s) penetrating deep into pores of the hardened fouling matrix and undergoing a chemical reaction that causes the fouling fracturing agent(s) to release oxygen. As shown in FIG. 5F, the oxygen released from the fouling fracturing agent(s) expand and rapidly collapse inside the pores of the fouling structure, leading to a rapid change in pressure that produces tensional stress in the fouling structure. FIG. 5F illustrates how the pressure generated by the expansion and rapid collapse of the oxygen in the pores of the hardened fouling matrix is able to overcome the tensile strength of the hardened fouling matrix (e.g., coking fouling 420 and coked fouling 430) and mechanically fractures (e.g., breaks up) the solid structure of the hardened fouling matrix. Expansion and collapse of the air bubbles in the pores of the hardened fouling matrix is vital in breaking up the hardened fouling matrix into small pieces that can be washed out (as described above with respect to FIG. 5C).

Figure 6:
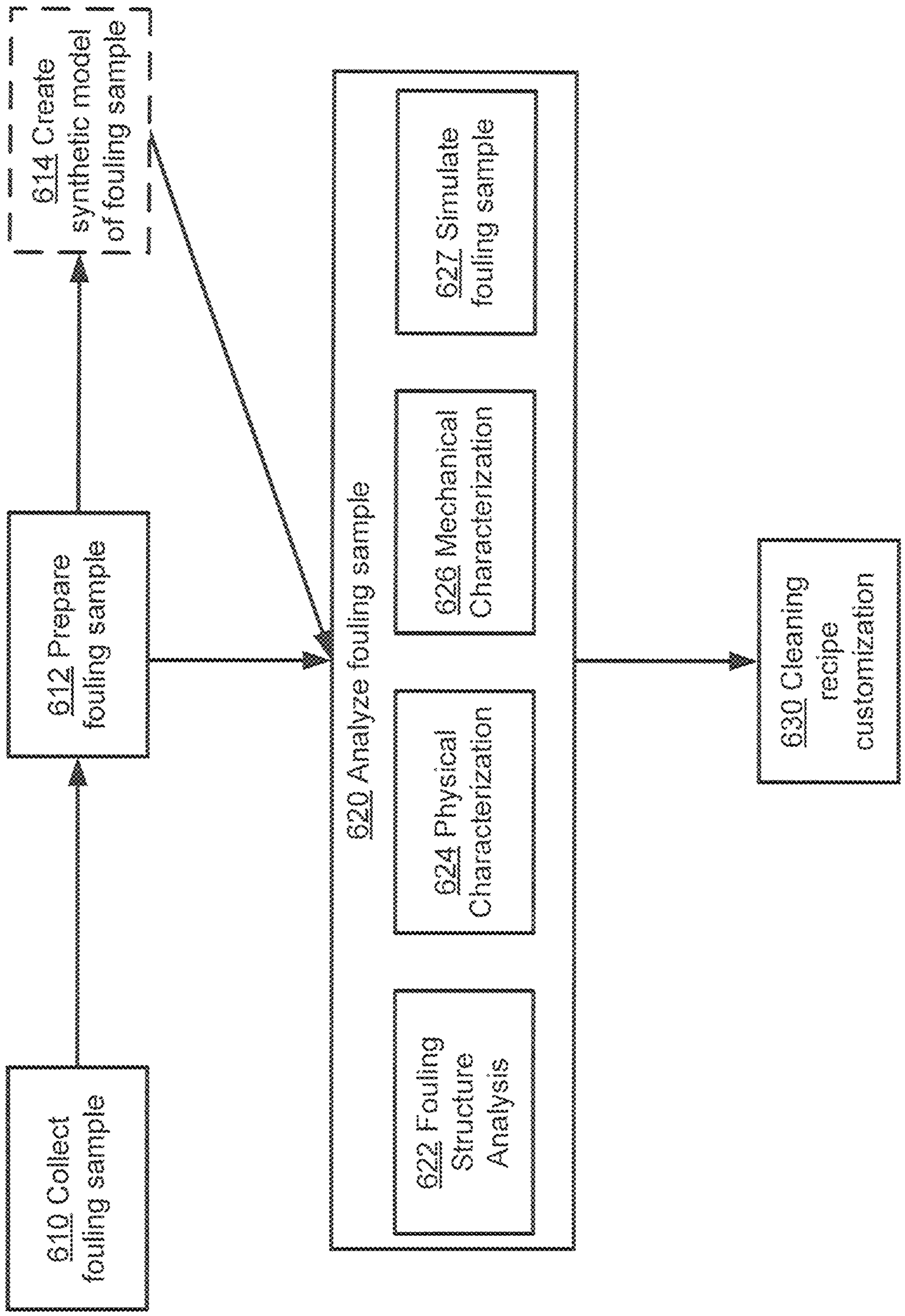
FIG. 6 is a flow diagram illustrating a process of generating a smart recipe according to aspects of the subject technology.

FIG. 6 is a flow diagram illustrating a process of generating a smart recipe 110 according to aspects of the subject technology. Before a smart recipe is generated, analysis of fouling sample(s) is performed in order to characterize the fouling sample. In some embodiments, characterization of the fouling sample(s) includes chemical analysis to determine a chemical composition of the fouling sample(s), imaging of the fouling sample(s) to determine physical characteristics of the fouling sample(s), and mechanical analysis of the fouling sample(s) to determine elastic properties and tensile strength of the fouling sample(s). In some embodiments, the fouling sample can also be analyzed and used to generate a three-dimensional (3D) model of synthetic fouling. For example, based on imaging of the fouling sample(s), a 3D-printed synthetic fouling sample can be generated that has physical properties that mimic the collected fouling sample(s), such as similar pore sizes, pore types, and pore structure. In some embodiments, the collected fouling sample(s) can also be used to generate a geo-mechanical model and/or a 3D porous fouling microstructure model, and a flow simulation (e.g., 3D flow simulation) can be performed on the geo-mechanical model and/or a 3D porous fouling microstructure model to simulate fluid dynamics in the porous fouling.

FIG. 6 is a flowchart illustrating steps for analyzing and characterizing fouling sample(s) for use in generating a customized recipe 140. A fouling sample is collected (610) from equipment (e.g., fouling sample 144 is collected from wash-out during cleaning, collected from heat exchanger) and imaged to obtain a detailed macroscopic description of the fouling sample. The fouling sample may be imaged via any of: photography, micro-tomography, computerized tomography (CT) scan, and magnetic resonance imaging (MRI). The fouling sample is prepared (612) for analysis. For example, preparation of the fouling sample may include drilling cylindrical plugs out of the fouling sample, cleaning thing cylindrical plugs, and drying the cylindrical plugs. In another example, the fouling sample may be sliced into thin-sections. In yet another example, smaller fouling samples, such as debris may be cleaned and dried in preparation for analysis. In some embodiments, a synthetic model (e.g., three-dimensional (3D) model, 3D-printed model) of the fouling sample is created (614) (e.g., synthesized, generated, formed, printed) based on imaging results of the fouling sample (e.g., based on images of the fouling sample). In some embodiments, preparing the fouling sample includes conducting a search for analogues to the fouling sample in a repository (e.g., search a repository that includes information regarding other fouling samples, such as previously collected fouling samples, for information regarding other fouling samples that appear to have similar properties to the fouling sample currently being prepared for analysis).

The fouling sample and the synthetic model of the fouling sample (when applicable) are analyzed (620) to determine the chemical composition of the fouling sample(s), the mechanical properties (e.g., mechanical characteristics) of the fouling sample(s), and the physical properties (e.g., physical characteristics) of the fouling sample(s). In some embodiments, changes to the characteristics (e.g., chemical composition, physical characteristics, and mechanical characteristics) of the fouling due to aging (e.g., fouling aging) can also be determined.

Analysis (620) of the fouling sample and/or the synthetic model includes analyzing (622) the fouling structure of the fouling sample and/or the synthetic model, physical characterization (624) of the fouling sample and/or the synthetic model, mechanical characterization (626) of the fouling sample and/or the synthetic model, and running simulations (628) on a model (e.g., digital model) of the fouling sample. Analyzing (622) the fouling structure of the fouling sample and/or the synthetic model includes performing any of: integrated petrography analysis, analysis of images from the CT scan, analysis of images from MRI, and anisotropy analysis. Physical characterization (624) of the fouling sample and/or the synthetic model includes determining physical properties of the fouling sample and/or synthetic model. For example, various methods such as permeability measurements and tomographic imaging may provide information regarding pore characteristics (e.g., pore sizes, pore types, and pore structure), pore saturation (e.g., saturation of pores with resin), permeability, and wettability. Mechanical characterization (626) of the fouling sample and/or the synthetic model includes determining mechanical properties of the fouling sample and/or synthetic model, such as determining a viscosity, tensile strength, Young's modulus (e.g., elasticity), and/or Poisson's ratio for the fouling sample and/or synthetic model. A 3D digital model (e.g., virtual model, simulation) of the fouling sample can also be used to simulate and determine a model of the porous 3D microstructure of the fouling sample, simulate 3D flow mechanics using geomechanical model(s), and simulate the effect of different cleaning processes on the fouling sample. Additional details regarding analysis (620) of the fouling sample is provided below with respect to FIGS. 7A-7C, and 8A-8F.

The ability to simulate the effect of different cleaning processes on the fouling sample allows the cognitive service provider to improve (e.g., optimize) the customized cleaning recipe 140 by simulating the effects of applying different cleaning agents, surfactants, and solutions as well as varying temperature, pressure, and time duration during the cleaning process. Using the analysis (620) methods described above, a custom cleaning recipe 140 is generated (630) based on the chemical, mechanical, and physical properties of the fouling sample(s) and associated models (e.g., synthetic model, digital model). Customization (630) (e.g., generation, selection) of the cleaning recipe 140 includes surfactant design, cleaning recipe design, and quality control and safety validation to confirm compatibility with materials of the equipment.

Figures 7A, 7B:
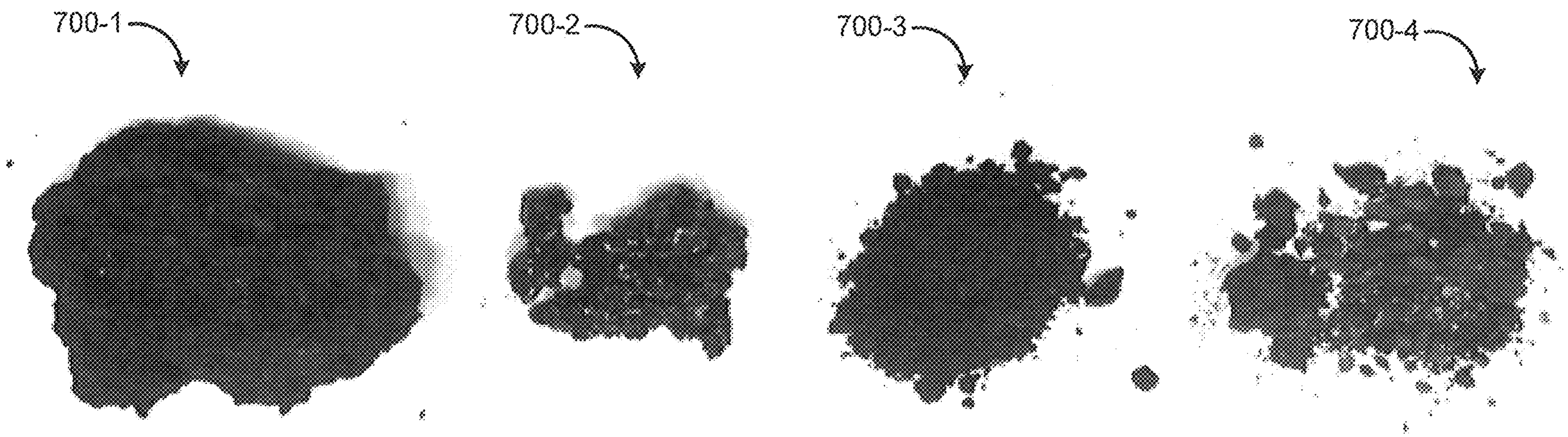

FIGS. 7A-7C illustrate chemical composition analysis results of fouling samples (e.g., fouling sample(s) 144 collected from washout during cleaning) according to aspects of the subject technology. Analysis of a fouling sample (e.g., sample of fouling deposit) may include the following data: percentage of elements or functional groups, degree of unsaturation, and degree of polymerization and molecular weight distribution.

FIG. 7A illustrate four different fouling samples: sample 700-1, sample 700-2, sample 700-3, and sample 700-4. In some embodiments, the samples are referred to collectively as samples 700. As shown, the fouling samples 700 look different from one another (e.g., different apparent size, different apparent porosity), and thus, can be expected to have different chemical, mechanical, and physical properties from one another. The fouling samples 700 are tested for ignition weight loss and sample composition (e.g., chemical composition of the sample). In some embodiments, samples 700 that have a high content of inorganic materials are analyzed using inductively coupled plasma atomic emission (ICP-AES) and/or x-ray fluorescence (XRF)

FIG. 7B illustrates a table 710 that includes information regarding the chemical composition for the fouling samples 700-1, 700-2, 700-3, and 700-4. Chemical analysis of the fouling samples 700 reveal the amount of inorganic material, the amount of organic material, and the amount of carbon and carboids in each sample.

FIG. 7C illustrates a table 720 of results of ICP-AES and XRF conducted on samples 700-2 and 700-4, both of which include a high content of inorganic material. The ICP-AES and XRF results provide a breakdown of the chemical make-up of the fouling samples.

FIGS. 8A-8F illustrate models (e.g., computerized model, synthetic model) for characterization of a fouling sample according to aspects of the subject technology. Fouling characterization is a key element of the cognitive cleaning system 100 since the results of the fouling characterization are used to produce a customized cleaning recipe 140. The more accurate the fouling characterization and the more data is acquired regarding the fouling, the more efficient the customized cleaning recipe 140 can be. Fouling characterization may include modeling of operational and product data and analysis of the fouling sample (and optionally, synthetic 3D printed models and/or 3D computer models of the fouling sample). The objective of fouling characterization is to establish a systematic practice of fouling modeling and cross-validating the results to ensure a good match between the model results and laboratory tests. Model results may be used for building of a fouling level forecast and smart recipe assessment as to keep the analytical cleaning profile updated.

Fouling deposits characterization data may be obtained through a number of analytic methods including but not limited to: Fourier transform infrared spectroscopy (FTIR), scanning electron microscopy (SEM), SEM energy dispersive spectroscopy (SEM-EDS), X-ray crystallography (XRC), atomic absorption spectroscopy (AAS) and atomic emission spectroscopy with inductively-coupled plasma (ICP-AES).

Fouling characterization include using any of: physical modeling, machine learning methods, and hybrid integrating physical modeling with machine learning methods. Fouling characterization results can include fouling sequence analysis, facies analysis, qualitative and quantitative interpretation (referring to analytical and samples lab analysis), and chemical and physical description of the facies within the fouling sequence.

Combining hybrid model with physical properties of the product data (density, viscosity, crude oil grade, chemical properties) allows the subject technology to characterize the fouling. The determined fouling characteristics are used to design the customized cleaning recipe 140.

In certain cases fouling characterization can be simulated based on synthetic data generated by 1-3 models. Such simulations can be useful for history matching purposes to limit number of base scenarios within the simulation.

Within the fouling characterization process the following major fouling mechanisms may be modeled and co-modeled:

Corrosion fouling, representing chemical reactions between equipment surfaces (e.g., metal surfaces) and any components or dissolved gases of the flowing fluid;

Chemical fouling, representing chemical reactions or phase-transitions between/of any components of the flowing fluid which result in precipitation of solids on the surface of the heat exchanger;

Particles fouling, representing accumulation of suspended particles contained in the flowing fluid; and Crystallization fouling—representing deposits of salts dissolved in the flowing fluid which crystallize on the inner surface of heat exchanger.

It is noted that mechanical imperfections on the surfaces of equipment can accelerate corrosion and other fouling mechanisms.

Figure 8A:
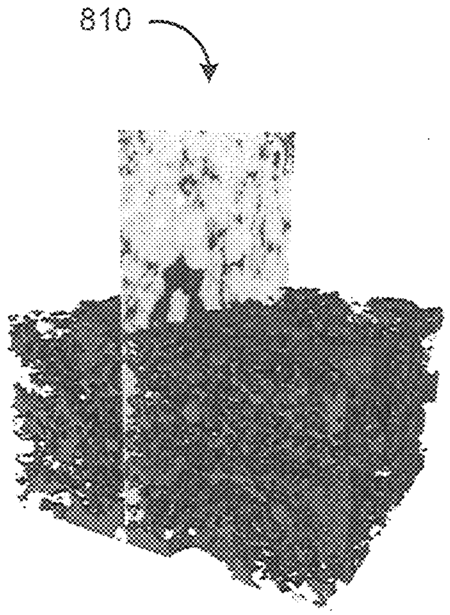
FIGS. 8A-8F illustrate models for characterization of a fouling sample according to aspects of the subject technology.
Figure 8B:
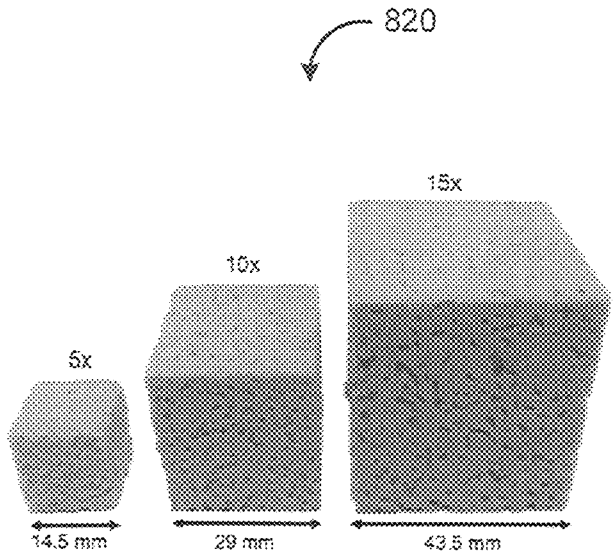

Referring to FIGS. 8A and 8B, characterization of the fouling samples includes generating a computer model 810 (e.g., 3D computer model, virtual model) and/or a synthetic model 820 (e.g., 3D-printed model, synthetic 3D model) of the fouling sample. Using the computer model 810 and/or the synthetic 3D model 820, physical properties of the fouling sample, such as the porosity and permeability of the fouling sample, can be determined. For example, quantitative analysis of a fouling sample may include performing one or more imaging techniques, such as micro computed tomography (microCT), on the fouling sample. The imaging results can be used to generate the computer model 810 and/or the synthetic 3D model 820.

The synthetic 3D model 820 is a 3D printed polymetric model of the fouling sample. In some embodiments, the synthetic 3D model 820 may be upscaled from the original tomographic volume to ensure the synthetic 3D model 820 can be generated (e.g., printed) in accordance with a resolution of the 3D printer. Using the synthetic 3D model 820, porosity and permeability of the fouling sample can be determined. For example, porosity of the synthetic 3D model 820 can be determined via mercury injection where a volume of mercury penetrated into a same is measured as a function of pressure. The pore throat size distribution and pore throat diameter can be calculated from the cumulative volume of mercury intruded in the sample. The permeability of the synthetic 3D model 820 can be calculated based on the mean pore throat diameter and capillary pressure size. The absolute permeability can also be calculated based on results of the mercury injection experiment. Additionally, the computer model 810 may be used to simulate one or more techniques, such as mercury injection, to confirm and verify results obtained from experiments (such as mercury injection experiment) conducted on the synthetic 3D model 820.

Figure 8C:
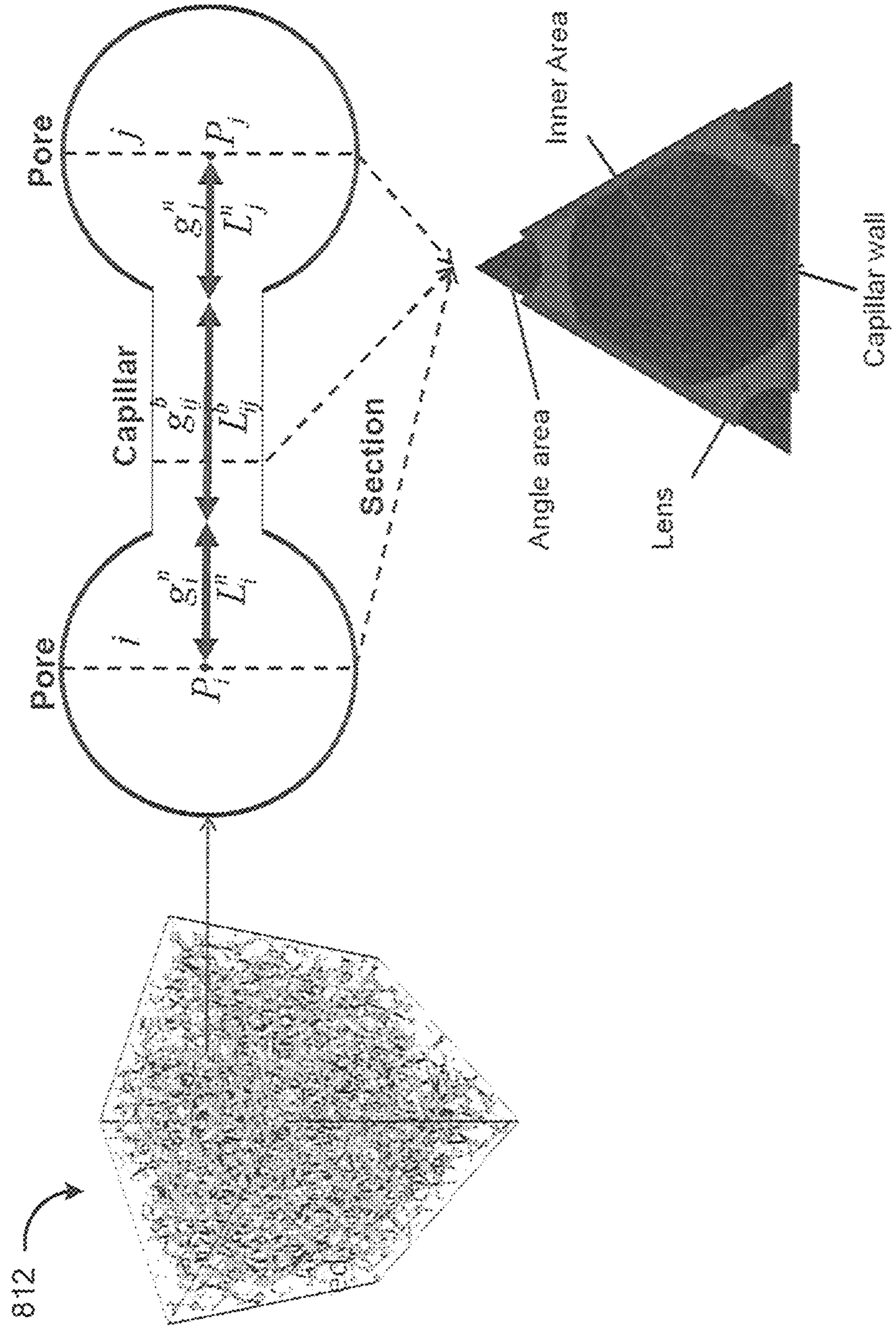

Referring to FIG. 8C, using information obtained via imaging of the fouling sample, pore parameters and parameters the capillaries in a fouling sample can be determined and generated into a computer model, such as computer model 810 (shown in FIG. 8A) or computer model 812. The computer model (e.g., model 810 or model 812) can be used to generate pore pressure modeling, shown in FIG. 8D, in order to determine the amount of pressure required to overcome the tensile strength of the fouling structure and break the fouling during the cleaning process.

Figure 8D:
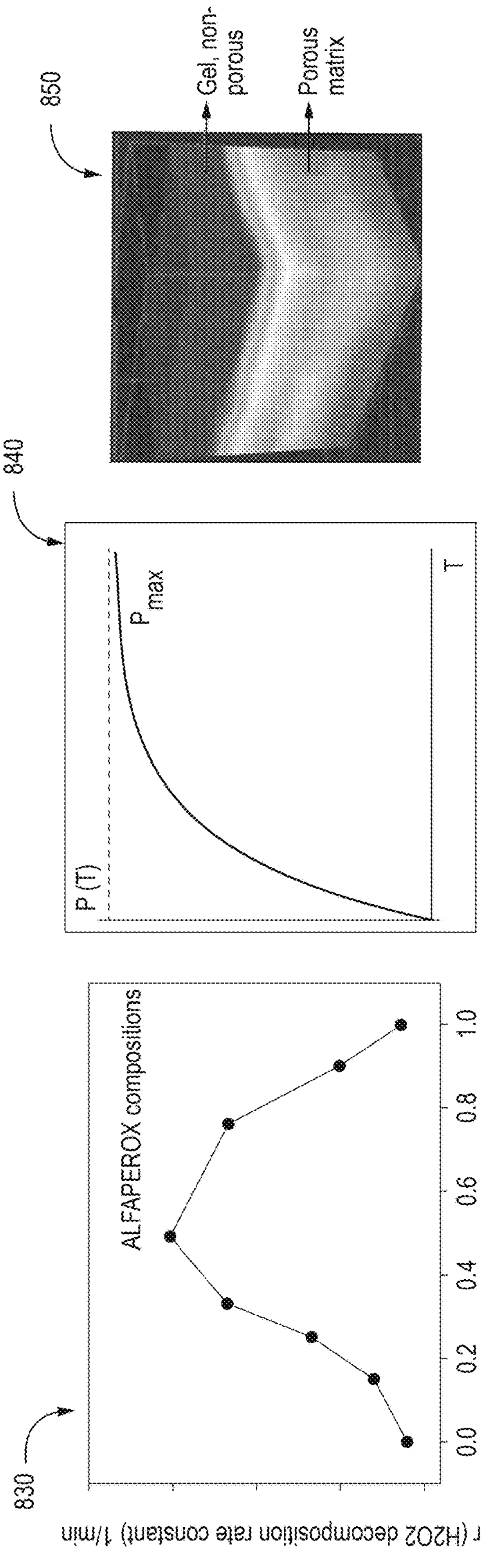

FIG. 8D illustrates a model 830 showing hydrogen peroxide decomposition into oxygen, a model 840 showing the amount of pore pressure build-up due to hydrogen peroxide decomposition (e.g., oxygen generation) for a constant decomposition rate and fixed volume, and a model 850 showing a predicted pore-pressure build up in the 3D volume of the fouling structure (e.g., the computer model 810 of the fouling sample). Thus, using information regarding the chemical, physical, and mechanical properties of the fouling structure in combination with models of the pressure generated inside a pore due to hydrogen peroxide decomposition (e.g., into oxygen), a recipe can be generated to ensure that an appropriate amount of pressure is built-up in the fouling structure in order to break-up the hardened fouling matrix for effective cleaning.

Figure 8E:
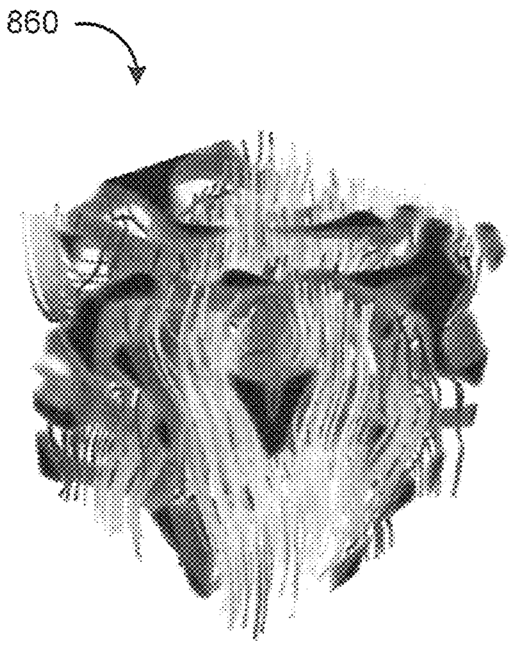
Figure 8F:
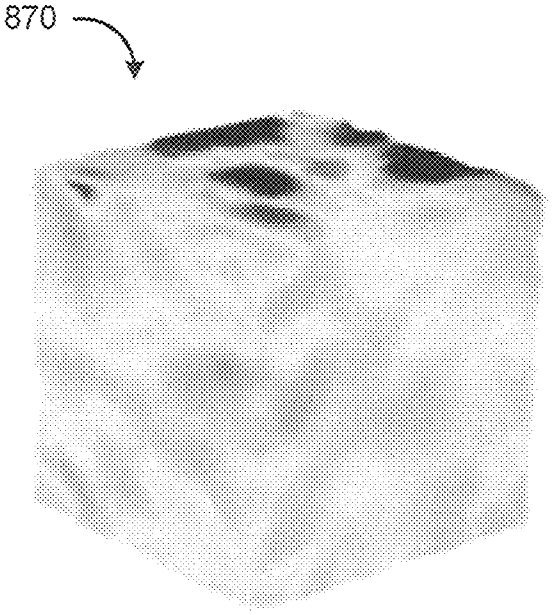

Referring to FIGS. 8E and 8F, an estimate the pore pressure required to fracture the fouling is determined based on fluid dynamics model(s) 860 and fouling mechanics model(s) 870 as described with respect to FIGS. 8A-8D. Using this information, the cognitive cleaning provider 212 generates a customized recipe 140 that is predicted to provide enough pore pressure build-up to fracture the fouling structure. The customized recipe 140 includes selection of one or more surfactants to remove fresh fouling and resins in the pores of hardened fouling structures, and selection of one or more catalysts and active agents to generate the desired pore-pressure build-up inside for fracturing the fouling structure.

FIGS. 9A-9C illustrate smart recipe design (e.g., a smart recipe design process 110) according to aspects of the subject technology.

FIG. 9A illustrates a predicted (e.g., estimated) response of fouling structures corresponding to fouling samples 700-1 through 700-4 to different first cleaning formulations. For example, sample 700-1 is expected to have partial dispersion in response to the use of first cleaning formulation OS3, and swell in response to the use of first cleaning formulation OS4 or OS5. Thus, any of first cleaning formulations OS3, OS4, and OS5 would be good candidates to be included in the cleaning recipe for a heat exchange system corresponding to sample 700-1.

FIG. 9B illustrates a predicted (e.g., estimated) response of fouling structures corresponding to fouling samples 700-1 through 700-4 to different second cleaning formulations. For example, sample 700-1 is expected to have complete dispersion in response to the use of second cleaning formulation B1, partial dispersion in response to the use of second cleaning formulation B2, and swelling in response to the use of second cleaning formulation B3. The use of second cleaning formulations B1 and B4 are expected to be inefficient in cleaning fouling corresponding to sample 700-1. Thus, any of second cleaning formulations B1, B2, and B3 would be good candidates to be included in the cleaning recipe for a heat exchange system corresponding to sample 700-1.

FIG. 9C illustrates a predicted (e.g., estimated) response of fouling structures corresponding to fouling samples 700-1 through 700-4 to different formulations (e.g., the customized recipes 140). The customized recipe 140 for the fouling samples are determined based on the results shown in FIGS. 9A and 9B. For example, the customized recipe for a heat exchange system associated with fouling sample 700-1 includes the use of first cleaning formulation OS3 and second cleaning formulation B1, both of which are predicted to illicit good swelling response in the fouling structure. In another example, the customized recipe for a heat exchange system associated with fouling sample 700-2 includes the use of first cleaning formulation OS4 and second cleaning formulation B4, both of which are predicted to illicit partial dissolution and complete dispersion in the fouling structure.

The customized recipe 140 represents a specific design of a fouling-driven chemical composure sequence, its volume and application method for the heat exchanger fouling treatment. The customized recipe 140 may be designed based on the fouling function and fouling characterization for the heat exchanger. The customized recipe 140 may be designed manually or automatically depending on the complexity of the fouling and experience with particular heat exchangers.

From a functional point of view, the customized recipe 140 is implemented in two key forms which serve different objectives: a provisional recipe and an actual recipe. The provisional recipe is an assessment of a cleaning recipe used within the cognitive cleaning planning phase as an input for smart scheduling 112. The provisional recipe provides data used for smart schedule simulation and evaluation of the results along with the Monthly, Quarterly and Annual Fouling Level Forecasts. The actual recipe is an actual cleaning recipe used within the cleaning implementation phase (e.g., during multi-stage cleaning 250) which is used in the process of in-situ components blending and the smart cleaning process 114 using the latest weekly fouling level forecasts and the pre-cleaning fouling characterization report.

Similar to the fouling level estimate and the fouling characterization, the customized recipe 140 may be produced using the following methods: physical modeling, machine learning methods, and a hybrid integrating physical modeling with machine learning methods. The customized recipe 140 results may include both chemical products content and also treatment technology (treatment phases, their duration, environment). The customized recipe 140 strategy development considers priority of safety and corrosion conditions in cleaning conditions and logistics conditions.

Figure 10:
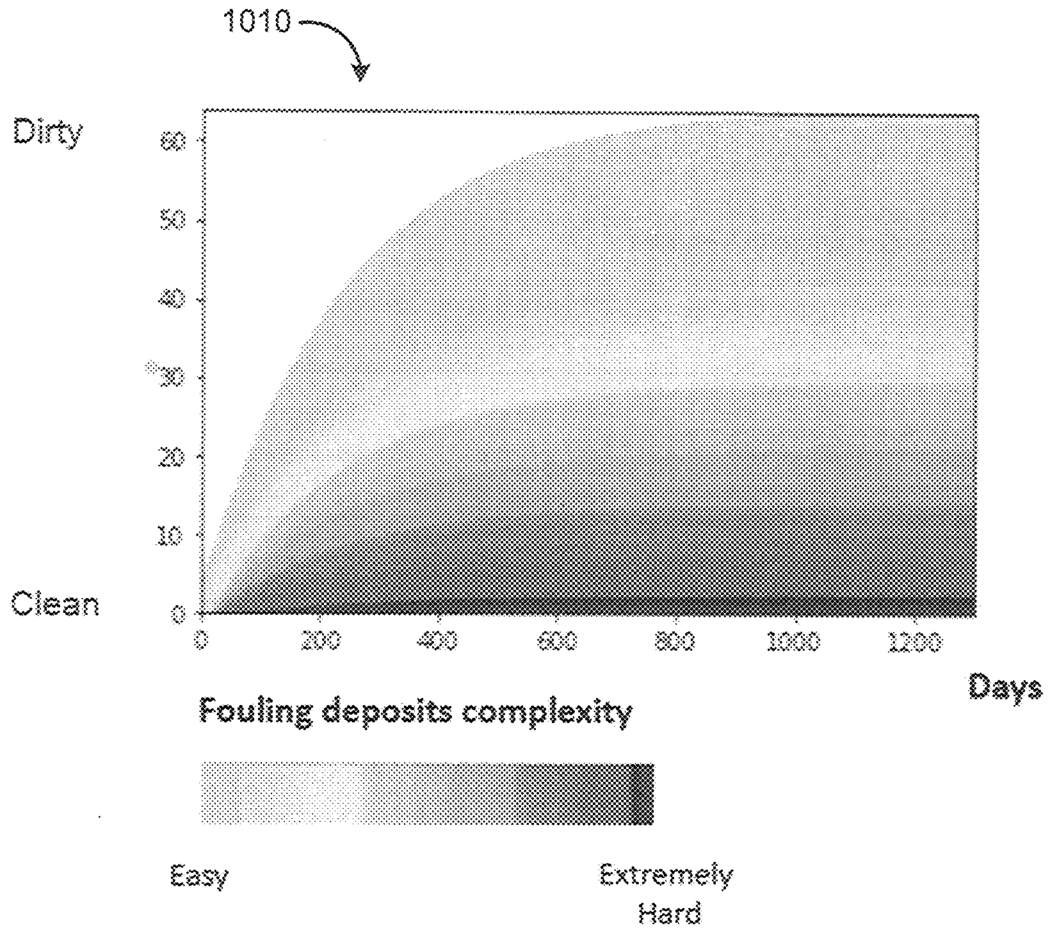
FIG. 10 illustrates a fouling function according to aspects of the subject technology.

FIG. 10 illustrates a fouling function 1010 (e.g., corresponding to fouling function 230) according to aspects of the subject technology. The fouling function 1010 is a model that estimates the amount of accumulated fouling over time. The fouling function 1010 is determined based on the fouling structure, physical characteristics of the fouling, mechanical characteristics of the fouling, degradation of heat exchange system performance over time, and cleaning costs. The fouling function 1010 can be expressed as an influence over the heat transfer performance of a heat exchanger system and/or operational cost of a heat exchanger system. The customized schedule 142 is determined based at least in part on the fouling function 1010.

Data is analyzed to build the fouling function 1010, which expresses a relationship between fouling formation and operational data, and its influence over heat transfer and costs. Such a relationship may be established using physical modeling, machine learning methods, and/or a hybrid integrating physical modeling with machine learning methods. Physical models may utilize detailed information of the system (for example, geometry of heat exchangers, technological architecture, physical properties of the flows and equipment). Physical models may be cross-validated by matching data to calibrate and improve accuracy. Machine learning methods may establish relationships between fouling and operational data based on data analysis and may utilize relatively large amounts of historical data with high discretization to produce stable results. However, machine learning models may not be interpretable or provide the physics underlying the model. Hybrid modeling combines both physical and machine learning methods to produce accurate and quick results, where physical information may be preserved and used to improve precision of the model. The fouling function 1010 may be used as an input to obtain a cleaning function. The cleaning function is based on fouling characteristics and cleaning parameters, and takes into consideration details regarding customized (e.g., tailored, individualized) cleaning recipe and cleaning technology.

The fouling function 1010 may be determined based on the fouling level estimate, fouling characterization and a production plan. The fouling function 1010 provides an outlook to a future state of the heat exchanger system and its operational characteristics, focusing future fouling situation and its impact over production efficiency.

In order to build an accurate fouling function 1010, historical climate data and climate forecasts may be incorporated since the fouling function 1010 may react to outside temperature. The accuracy of the fouling function 1010 also may depend on the methods used to produce the fouling function 1010 and fouling characterization. In cases when the input models are rough, the fouling function 1010 may be used as a trend to parameterize generating a customer schedule 142.

In practice there are two key methods to produce fouling function 1010: (i) regression analysis and (ii) an artificial neural network (ANN). Regression analysis is a set of statistical processes for estimating relationship between dependent variable (fouling level) and independent variables, and ANN is a method for providing output (fouling level) given historical outputs and inputs without being programmed. In cases when there is a lot of data available, the ANN may generate better results than the regression analysis. However, the weights inside of ANN may be unable to be interpreted. On the other hand, regression analysis may deliver more interpretable results and can be applied when there is shortage of data for analysis. The cognitive cleaning system 100 may be implemented regardless of the method used, though testing may be done to compare both methods to identify preferable results. The ANN method has a long-term advantage, since it learns from the previous implementations and is not human-biased.

The fouling function 1010 may be regularly updated with more data to come and used for making provisional decision-making in procurement, economic evaluation and recipe planning. Actual data may be cross-checked against the forecast at times of review. Large discrepancies should be evaluated, and anomalies should be explained and based on the finding the models get updated.

There are several different types of fouling function 1010 reviews within the cognitive cleaning system 100, depending on their functional role: weekly forecast; monthly forecast; quarterly forecast; and annual forecast. Weekly forecasting reviews may be used for tracking weekly changes of the fouling plan/actuals to ensure that equipment within a heat exchanger system operates within the "Unlikely" fouling level. Whenever the weekly forecast review indicates that actual fouling level is above "Unlikely," a cleaning preparation sequence may be triggered. Monthly, quarterly and annual forecasting may be used for budgeting purposes translating fouling level forecasts in terms of costs and time within the Smart Scheduling process. The fouling function 1010 is an actionable insight element of the cognitive cleaning system 100 used by smart scheduling 112 to generate a customized schedule 142.

FIG. 11 illustrates a graph 1110 that shows the improvement in the relative heat transfer efficiency of a heat exchanger when maintained in accordance with a customized schedule 142 generated via smart scheduling 112 compared to when maintained in accordance with conventional cleaning intervals (e.g., during plant shut down, which may occur, for example, once a year). As shown, maintenance of the heat exchanger system in accordance with the customized schedule 142 can provide significant economic gains relative to conventional maintenance schedules which require plant shutdown to perform equipment cleaning.

Figure 12:
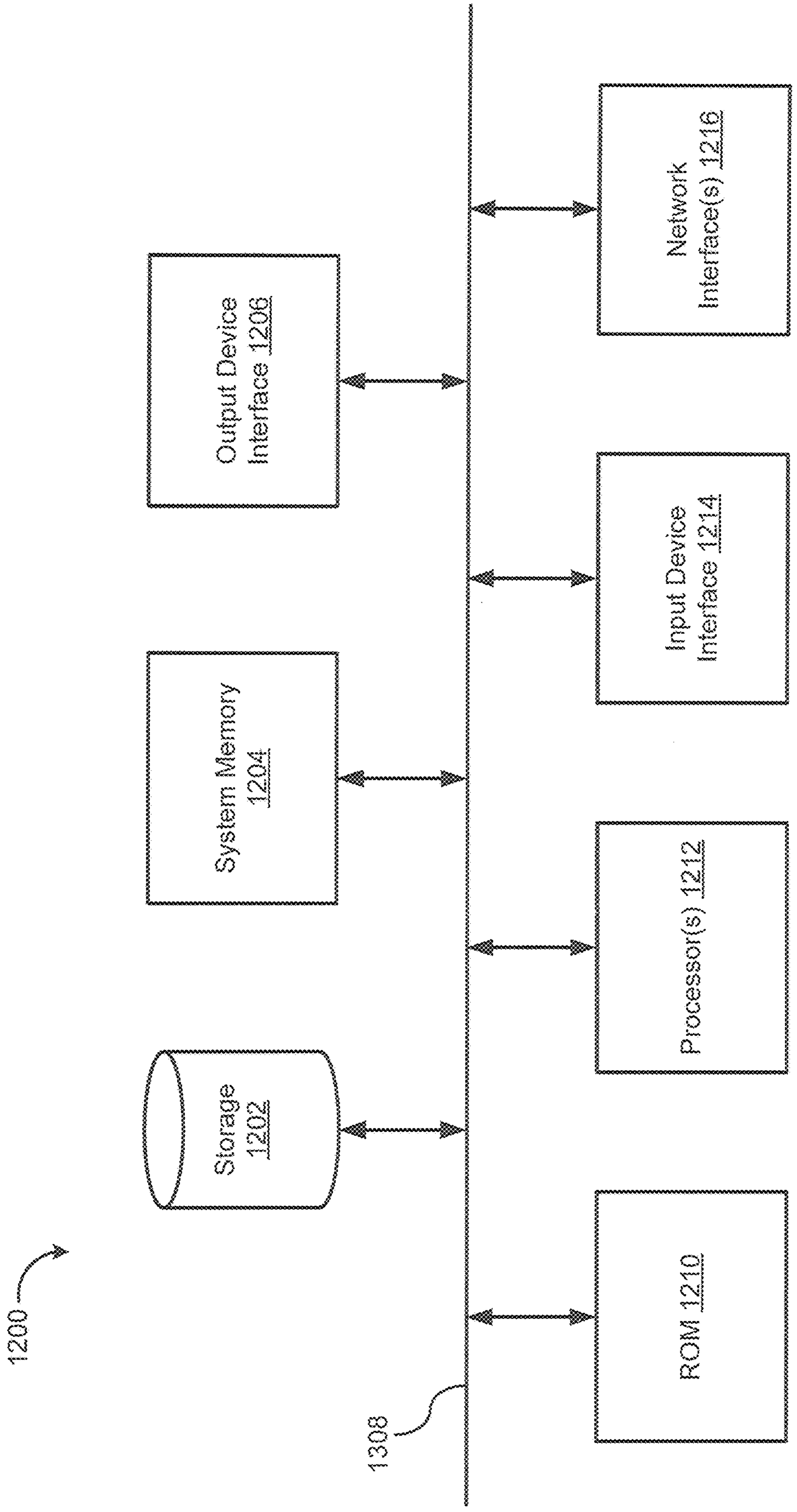
FIG. 12 illustrates an electronic system with which aspects of the subject technology may be implemented.

FIG. 12 illustrates an electronic system 1200 with which one or more implementations of the subject technology may be implemented. The electronic system 1200 can be, and/or can be a part of, processor/controller. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks and/or to one or more network nodes, such as the electronic device 102 shown in FIG. 1, through the one or more network interface(s) 1216. In this manner, the electronic system 1200 can be a part of a network of computers (such as a LAN, a wide area network ("WAN"), an Intranet, or a network of networks, such as the Internet. Any or all components of the electronic system 1200 can be used in conjunction with the subject disclosure.

Figure 13:
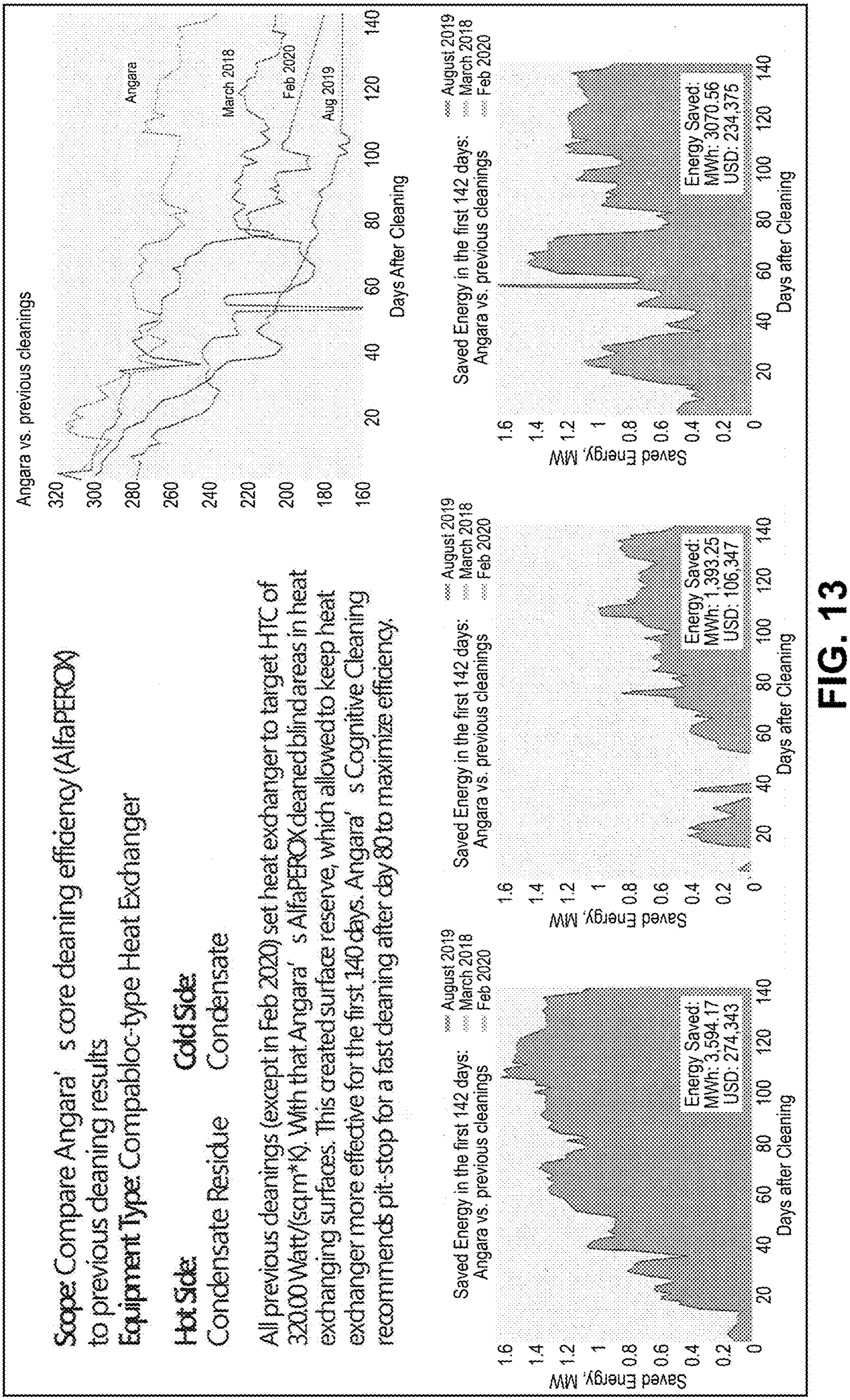
FIG. 13 illustrates projected gains in a heat exchanger system when fouling is maintained in accordance with aspects of the subject technology.
Figure 14A:
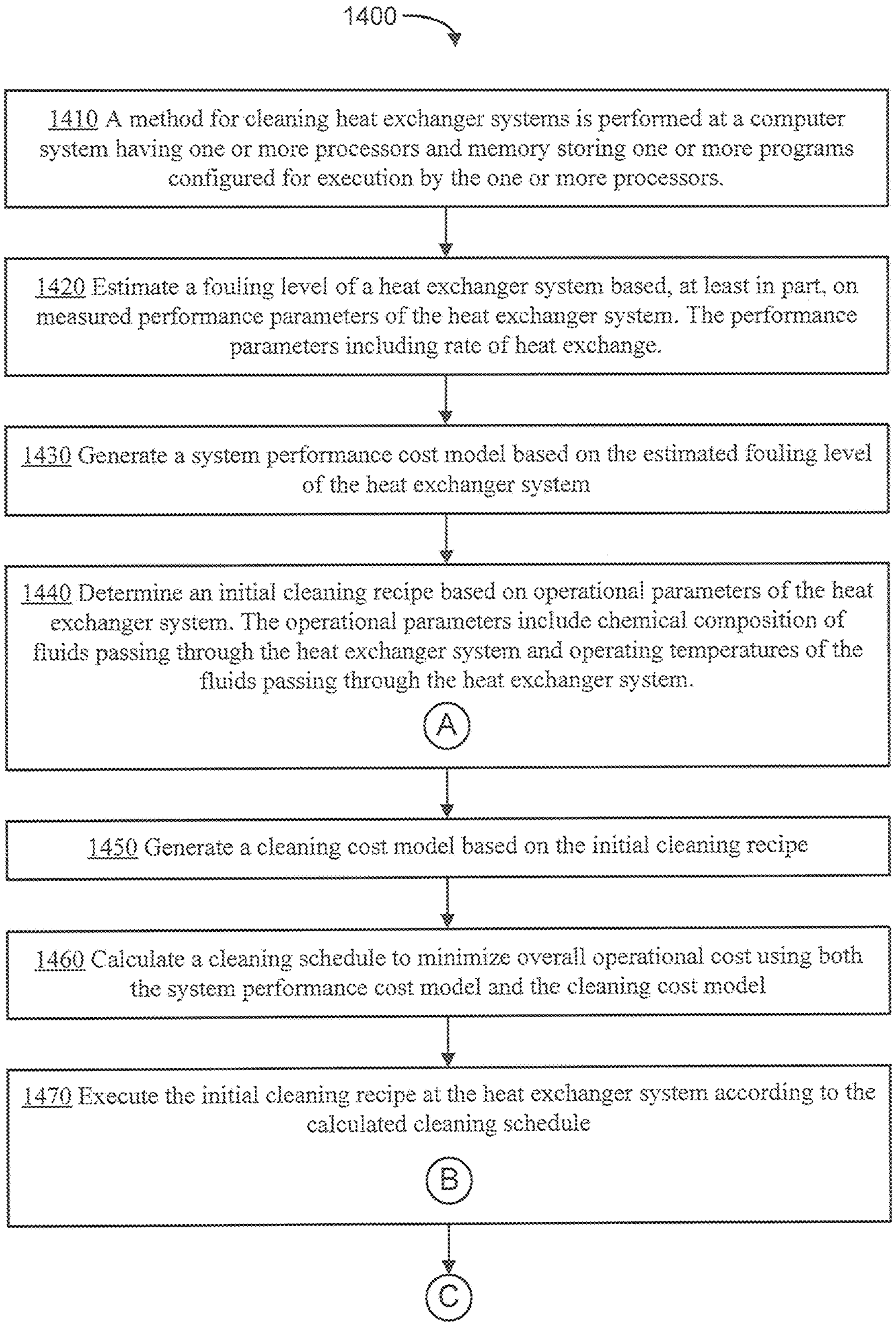
FIGS. 14A-14D illustrate a flow chart of a method cleaning heat exchanger systems in accordance with aspects of the subject technology.
Figure 14B:
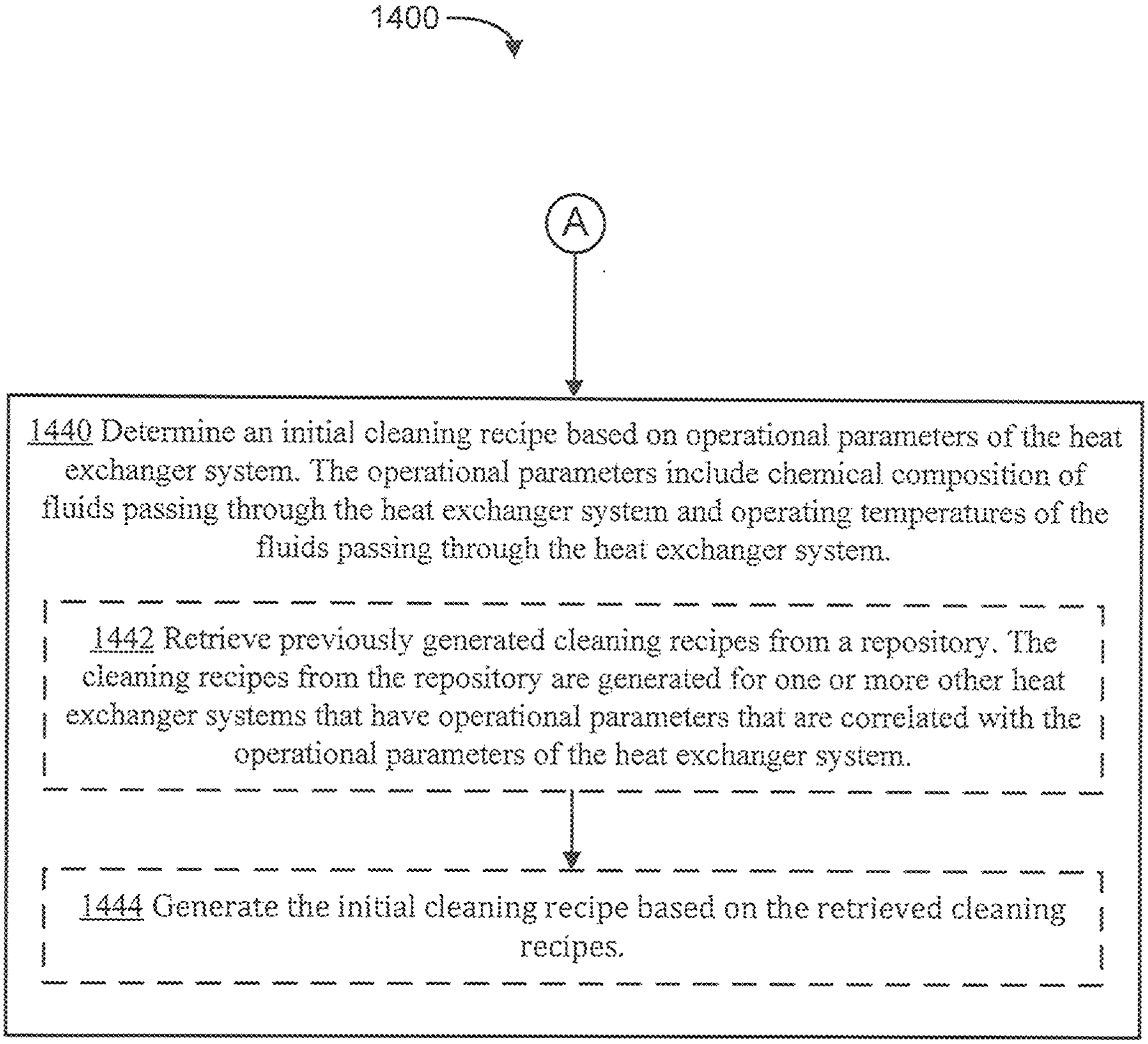
Figure 14C:
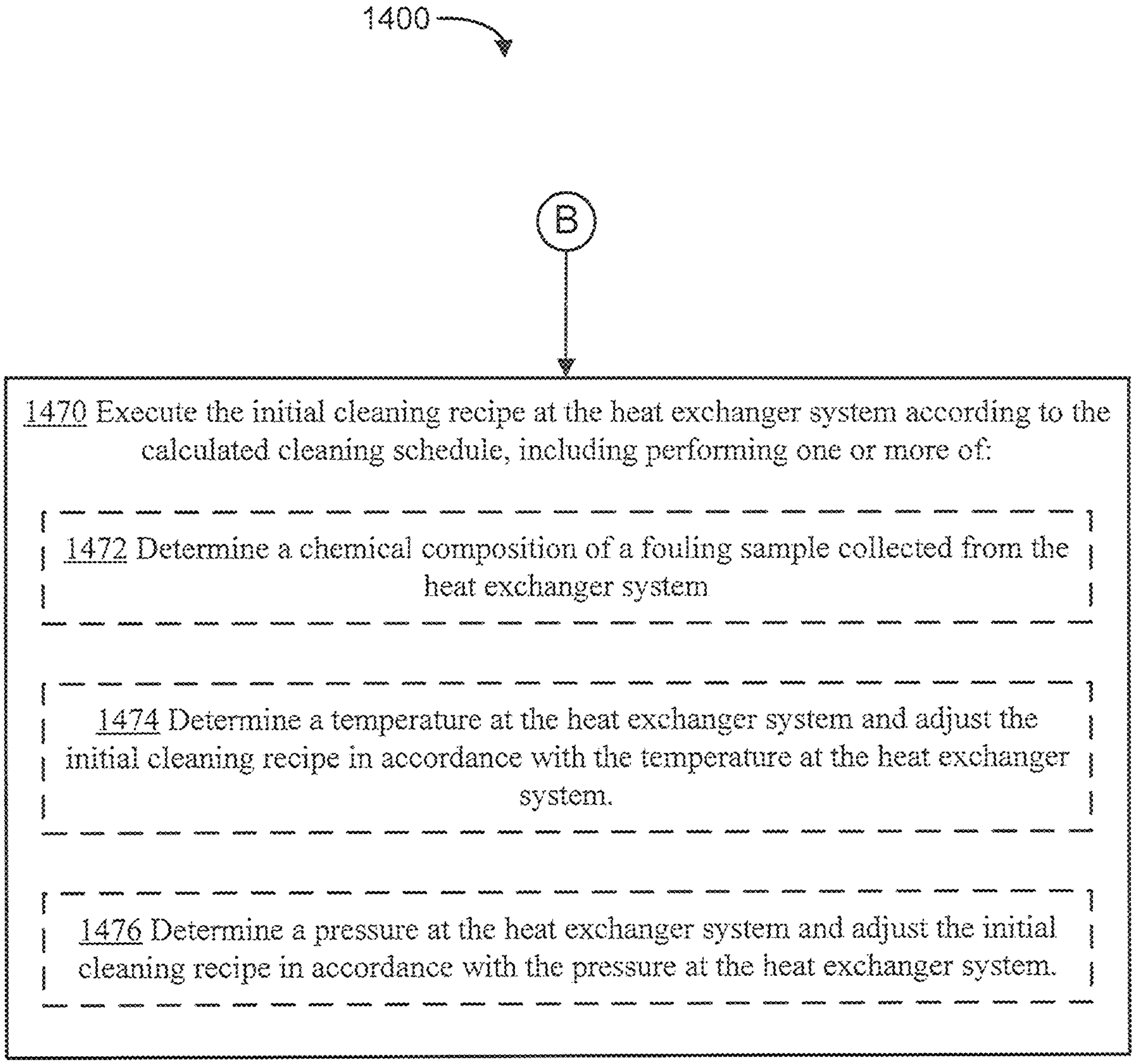
Figure 14D:
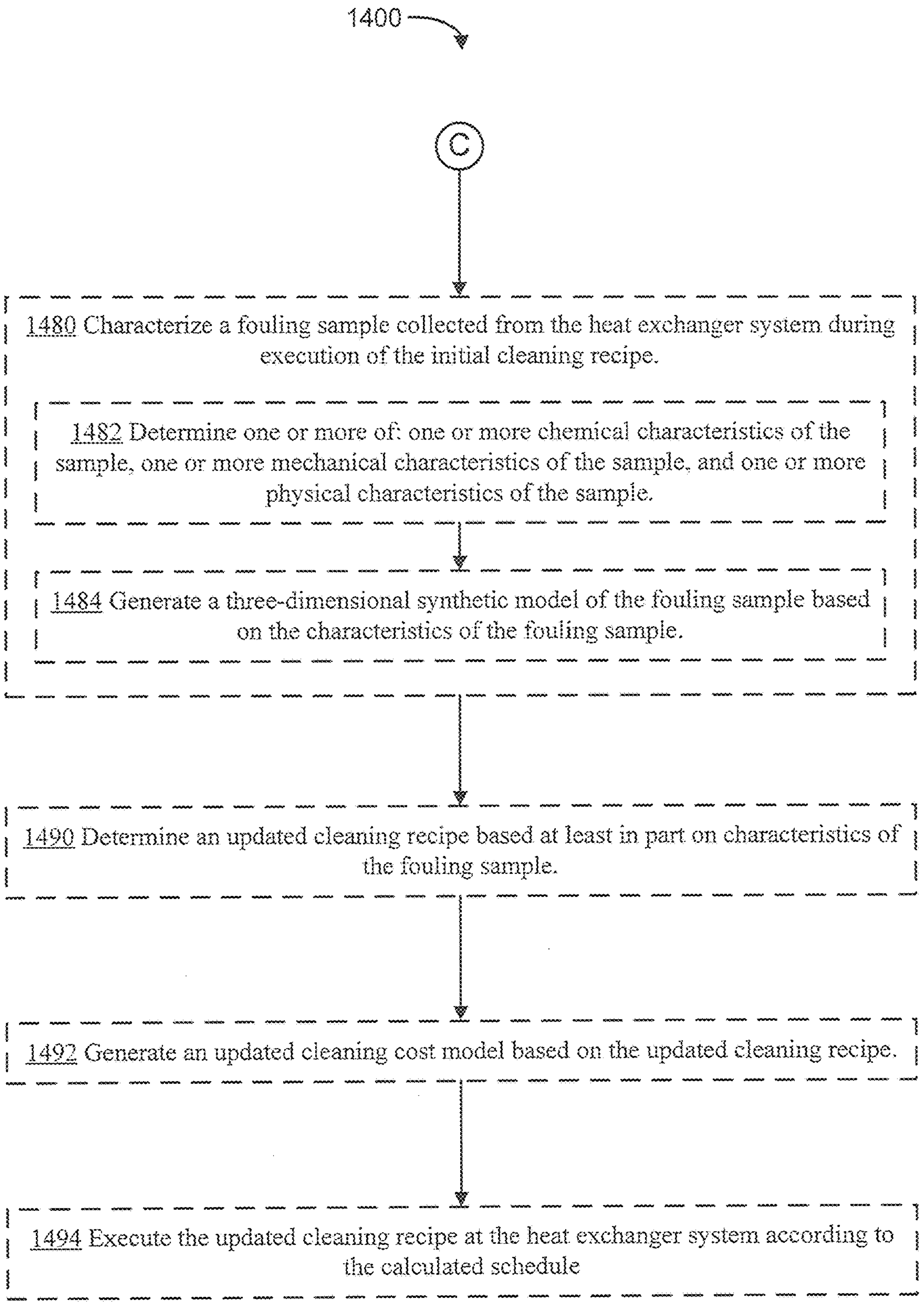

FIG. 13 illustrates projected gains in a heat exchanger system when fouling is maintained in accordance with aspects of the subject technology. The graphs in FIG. 13 illustrate an amount of energy saved over time when using the cognitive cleaning system 100 relative to prior cleaning methods.

FIGS. 14A-14D illustrate a flow chart of a method 1400 for cleaning heat exchanger systems in accordance with aspects of the subject technology. The method 1400 is performed (e.g., executed) (1410) at a computer system (e.g., the electronic system 1200) having one or more processors (e.g., the processor(s) 1212) and memory (e.g., the system memory 1204) storing one or more programs configured for execution by the one or more processors. The method 1400 includes estimating (1420) the fouling level of a heat exchanger system (e.g., the equipment of a heat exchanger system) based, at least in part, on measured performance parameters of the heat exchanger system (e.g., generate a fouling level estimate 262 based on system performance data 260). The performance parameters include rate of heat exchange. The method 1400 also includes generating (1430) a system performance cost model 232 based on the estimated fouling level (e.g., fouling level estimate 262) of the heat exchanger system and determining (1440) an initial cleaning recipe (e.g., an initial recipe that is a customized recipe 140) based on operational parameters of the heat exchanger system. The operational parameters include chemical composition of fluids passing through the heat exchanger system and operating temperatures of the fluids passing through the heat exchanger system (e.g., system performance data 260, which may include any of sensor data 224 and system data 226). The method 1400 further includes generating (1450) a cleaning cost model 264 based on the initial cleaning recipe and calculating (1460) a cleaning schedule 142 (e.g., customized schedule 142) to minimize overall operational cost using both the system performance cost model 232 and the cleaning cost model 264. The method 1400 also includes executing (1470) the initial cleaning recipe (e.g., performing multi-stage cleaning 250 using the customized recipe 140) at the heat exchanger system according to the calculated cleaning schedule 142.

In some embodiments, determining (1440) an initial cleaning recipe (e.g., customized recipe 140) includes retrieving (1442) previously generated cleaning recipes from a repository and generating (1444) the initial cleaning recipe (e.g., customized recipe 140) based on the retrieved cleaning recipes. The cleaning recipes from the repository are generated for one or more other heat exchanger systems that have operational parameters that are correlated with the operational parameters of the heat exchanger system (e.g., have similar or same chemicals/materials/material types, overlapping temperature range, and/or overlapping pressure range.

In some embodiments, executing (1470) the initial cleaning recipe includes one or more of: determining (1472) a chemical composition of a fouling sample 144 collected from the heat exchanger system, determining (1474) a temperature at the heat exchanger system and adjusting (1474) the initial cleaning recipe (e.g., customized recipe 140) in accordance with the temperature at the heat exchanger system, and determining (1476) a pressure at the heat exchanger system and adjusting (1476) the initial cleaning recipe in accordance with the pressure at the heat exchanger system.

In some embodiments, the method 1400 further includes characterizing (1480) a fouling sample collected from the heat exchanged system during execution of the initial cleaning recipe (e.g., fouling sample 144 collected during multi-stage cleaning 250) and determining (1490) an updated cleaning recipe (e.g., another customized recipe 140) based at least in pat on characteristics of the fouling sample. The method 1400 also includes generating (1492) an updated cleaning cost model based on the updated cleaning recipe and executing (1494) the updated cleaning recipe at the heat exchanger system according to the calculated schedule 142.

In some embodiments, characterizing (1480) a fouling sample 144 includes determining (1482) one or more of: one or more chemical characteristics (e.g., chemical composition) of the fouling sample 144, one or more mechanical characteristics (e.g., mechanical property) of the fouling sample 144, and one or more physical characteristics (e.g., physical property) of the fouling sample 144.

In some embodiments, characterizing (1480) a fouling sample 144 includes generating (1484) a three-dimensional synthetic model 820 if the fouling sample 144 based on the characteristics of the fouling sample 144. In some embodiments, the three-dimensional synthetic model 820 has mechanical properties and/or physical properties that resemble (e.g., mimic, are the same as) the mechanical properties and/or physical properties of the collected fouling sample 144. For example, the three-dimensional synthetic model 820 may have a permeability and/or porosity that is the same as the collected fouling sample 144. In another example the three-dimensional synthetic model 820 may have an elasticity and/or pore sizes that is the same as the collected fouling sample 144.

In some embodiments, characterizing (1480) a fouling sample 144 includes generating a computer model (e.g., computer model 810, 812) that can be used to generate simulations such as a simulation of the effect of cleaning agents, chemicals, surfactants, solutions on the fouling sample. In some embodiments, the simulation results are used in generating customized recipes 140, such as an initial cleaning recipe and/or an updated cleaning recipe.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms “base station”, “receiver”, “computer”, “server”, “processor”, and “memory” all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of cleaning a heat exchanger system, comprising:

at a computer system having one or more processors and a memory storing one or more programs configured for execution by the one or more processors:

estimating a fouling level of the heat exchanger system based, at least in part, on measured performance parameters of the heat exchanger system, the performance parameters including rate of heat exchange;

generating a system performance cost model based on the estimated fouling level of the heat exchanger system;

determining component percentages of a solution for removing fouling in determining an initial cleaning recipe based on operational parameters of the heat exchanger system, the operational parameters including chemical composition of fluids passing through the heat exchanger system and operating temperatures of the fluids passing through the heat exchanger system;

generating a cleaning cost model based on the initial cleaning recipe;

calculating a cleaning schedule to minimize overall operational cost using both the system performance cost model and the cleaning cost model; and executing the initial cleaning recipe at the heat exchanger system according to the calculated cleaning schedule, wherein the solution is obtained from a formulation, and wherein the component percentages are determined to include:

hydrogen peroxide, 2-90 wt. %, complexing agent, 3-30 wt. %, water-soluble calixarene, 0.01-10 wt. %, and water, and wherein the complexing agent comprises a polybasic organic acid or a sodium salt thereof, or a derivative of phosphorous acid.

2. The method of claim 1, wherein:

executing the initial cleaning recipe includes:

mixing a plurality of components, based on the formulation, to generate the solution; and applying the solution to fouling in the heat exchanger system, thereby generating gas via decomposition of the solution, resulting in fracturing of the fouling.

3. The method of claim 2, wherein:

the generated gas includes oxygen; and generating the gas includes decomposition of hydrogen peroxide to generate the oxygen.

4. The method of claim 2, wherein decomposition of the solution is an exothermic decomposition process.

5. The method of claim 1, further comprising:

characterizing a fouling sample collected from the heat exchanger system during execution of the initial cleaning recipe;

determining an updated cleaning recipe based at least in part on characteristics of the fouling sample;

generating an updated cleaning cost model based on the updated cleaning recipe; and executing the updated cleaning recipe at the heat exchanger system according to the calculated schedule.

6. The method of claim 5, wherein characterizing the fouling sample includes determining one or more of:

one or more chemical characteristics of the fouling sample;

one or more mechanical characteristics of the fouling sample; and one or more physical characteristics of the fouling sample.

7. The method of claim 5, further comprising generating a three-dimensional synthetic model of the fouling sample based on the characteristics of the fouling sample.

8. The method of claim 1, wherein executing the initial cleaning recipe at the heat exchanger system includes one or more of:

determining a chemical composition of a fouling sample collected from the heat exchanger system;

determining a temperature at the heat exchanger system and adjusting the initial cleaning recipe in accordance with the temperature at the heat exchanger system; and determining a pressure at the heat exchanger system and adjusting the initial cleaning recipe in accordance with the pressure at the heat exchanger system.

9. The method of claim 1, wherein determining the initial cleaning recipe based on operational parameters of the heat exchanger system includes:

retrieving previously generated cleaning recipes, from a repository, generated for one or more other heat exchanger systems having operational parameters correlated with the operational parameters of the heat exchanger system; and generating the initial cleaning recipe based on the retrieved cleaning recipes.

10. The method of claim 1, wherein the complexing agent comprises a polybasic organic acid or a sodium salt thereof.

11. The method of claim 1, wherein the component percentages are further based on characterizing a fouling sample collected from the heat exchanger system.

12. The method of claim 11, wherein characterizing the fouling sample includes determining one or more of:

one or more chemical characteristics of the fouling sample;

one or more mechanical characteristics of the fouling sample; and one or more physical characteristics of the fouling sample.

13. The method of claim 11, wherein characterizing the fouling sample further comprises generating a three-dimensional synthetic model of the fouling sample based on the characteristics of the fouling sample.

14. The method of claim 1, wherein determining the component percentages is further based on determining a temperature at the heat exchanger system and/or determining a pressure at the heat exchanger system.

15. The method of claim 1, wherein the component percentages further comprise an organic acid in an amount of 3-30 wt. %.

16. The method of claim 15, wherein the organic acid comprises acetic acid, formic acid, propanoic acid, butanoic acid, oxalic acid, citric acid, sulfamic acid, adipic acid, tartaric acid, acid anhydrides, or any combination thereof.

17. The method of claim 1, wherein the component percentages further comprise a decomposition stabilizer of peroxide compounds in an amount of 1-5 wt. %.

18. The method of claim 17, wherein the decomposition stabilizer of peroxide compounds comprises one or more of: sodium hexametaphosphate, potassium phosphate, sodium hydrogen phosphate, and sodium dihydrogen phosphate.

19. The method of claim 1, wherein the component percentages further comprise a surfactant in an amount of 0.5-2.5 wt. %.

20. The method of claim 19, wherein the surfactant comprises sulfenic acid, an alkyl phenol ethoxylate, or a mixture of sulfenic acid and alkyl phenol ethoxylate.

21. The method of claim 19, wherein the surfactant comprises a mixture of sulfenic acid with an alkyl phenol ethoxylate in the ratio of 2:1.

22. The method of claim 1, wherein the component percentages further comprise an inhibitor in an amount of 0.5-1.5 wt. %.

23. The method of claim 1, wherein the complexing agent comprises a water-soluble chelating agent.

* * * * *